(12) United States Patent
Davis et al.

(10) Patent No.: US 10,812,755 B2
(45) Date of Patent: Oct. 20, 2020

(54) ARTICLE OF CLOTHING WITH VIDEO RECORDING DEVICE SUPPORT

(71) Applicant: UTILITY ASSOCIATES, INC., Decatur, GA (US)

(72) Inventors: Ted Michael Davis, Decatur, GA (US); Joseph Patrick Shanahan, Decatur, GA (US); Simon Araya, Atlanta, GA (US); Robert Stewart McKeeman, Decatur, GA (US); Eric Bedell, Decatur, GA (US); Jon McChristian, Decatur, GA (US)

(73) Assignee: UTILITY ASSOCIATES, INC., Decatur, GA (US)

( * ) Notice: Subject to any disclaimer, the term of this patent is extended or adjusted under 35 U.S.C. 154(b) by 11 days.

(21) Appl. No.: 16/146,712

(22) Filed: Sep. 28, 2018

(65) Prior Publication Data
US 2019/0037166 A1     Jan. 31, 2019

Related U.S. Application Data

(63) Continuation-in-part of application No. 15/957,648, filed on Apr. 19, 2018, which is a continuation of
(Continued)

(51) Int. Cl.
*H04N 5/72* (2006.01)
*H04N 5/77* (2006.01)
(Continued)

(52) U.S. Cl.
CPC ............... *H04N 5/772* (2013.01); *A41B 1/08* (2013.01); *A41D 1/04* (2013.01); *A41D 1/06* (2013.01);
(Continued)

(58) Field of Classification Search
CPC ..................................................... H04N 5/772
(Continued)

(56) References Cited

U.S. PATENT DOCUMENTS

| 5,358,110 A | 10/1994 | Simpson |
| 6,321,957 B1 | 11/2001 | Rossi |

(Continued)

FOREIGN PATENT DOCUMENTS

| DE | 202017101199 | 6/2018 |
| EP | 1345420 A2 | 9/2003 |

(Continued)

OTHER PUBLICATIONS

Notice of Allowance issued in co-pending U.S. Appl. No. 15/294,127, dated Jan. 11, 2019 (20 pages).
(Continued)

*Primary Examiner* — Eileen M Adams
*Assistant Examiner* — Daniel T Tekle
(74) *Attorney, Agent, or Firm* — Meunier Carlin & Curfman LLC

(57) ABSTRACT

A video recording device, holster and article of clothing are disclosed to reliably and covertly provide for the capture of video, audio, and metadata, and perform other commands. The holster may be provided with a carrier that is, in turn, inserted into the holster. In one embodiment, the holster may be confirmed as being associated with the video recording device to authenticate a user, and establishes a docked position. Moreover, the video recording device may enter a mode of operation associated with using the video recording apparatus automatically when inserted into a holster.

16 Claims, 20 Drawing Sheets

Related U.S. Application Data application No. 15/294,039, filed on Oct. 14, 2016, now abandoned.

(60) Provisional application No. 62/241,536, filed on Oct. 14, 2015.

(51) Int. Cl.

| | |
|---|---|
| *F41C 33/02* | (2006.01) |
| *A41D 1/04* | (2006.01) |
| *A41D 1/06* | (2006.01) |
| *A41D 3/00* | (2006.01) |
| *F41A 17/06* | (2006.01) |
| *G11B 31/00* | (2006.01) |
| *G11B 33/02* | (2006.01) |
| *G11B 33/06* | (2006.01) |
| *H04N 5/225* | (2006.01) |
| *A41B 1/08* | (2006.01) |
| *A45F 5/02* | (2006.01) |
| *A45C 13/10* | (2006.01) |
| *A41D 1/00* | (2018.01) |
| *A41D 27/20* | (2006.01) |

(52) U.S. Cl.
CPC ............ *A41D 3/00* (2013.01); *A45C 13/1069* (2013.01); *A45C 13/1092* (2013.01); *A45F 5/02* (2013.01); *F41A 17/06* (2013.01); *F41C 33/029* (2013.01); *G11B 31/006* (2013.01); *G11B 33/025* (2013.01); *G11B 33/06* (2013.01); *H04N 5/2252* (2013.01); *H04N 5/77* (2013.01); *A41D 1/002* (2013.01); *A41D 27/205* (2013.01); *A45F 2200/0516* (2013.01); *A45F 2200/0533* (2013.01)

(58) Field of Classification Search
USPC ........................................................ 386/228
See application file for complete search history.

(56) References Cited

U.S. PATENT DOCUMENTS

| | | | |
|---|---|---|---|
| 6,396,403 | B1 | 5/2002 | Haner |
| 8,439,191 | B1 | 5/2013 | Lu |
| 8,549,670 | B2 | 10/2013 | Demus |
| 8,945,328 | B2 | 2/2015 | Longinotti-Buitoni |
| 9,038,870 | B2 | 5/2015 | Johnson |
| 9,307,217 | B1 | 4/2016 | Day |
| 2003/0095688 | A1 | 5/2003 | Kirmuss |
| 2006/0165160 | A1 | 7/2006 | Winningstad et al. |
| 2008/0012706 | A1 | 1/2008 | Mak-Fan et al. |
| 2008/0061991 | A1* | 3/2008 | Urban ................. F41C 33/0209 340/573.1 |
| 2008/0191892 | A1 | 8/2008 | Kirkup et al. |
| 2009/0009945 | A1 | 1/2009 | Johnson et al. |
| 2009/0031467 | A1 | 2/2009 | Swindells et al. |
| 2009/0181729 | A1 | 7/2009 | Griffin, Jr. et al. |
| 2009/0186652 | A1 | 7/2009 | Combs et al. |
| 2009/0257603 | A1 | 10/2009 | Chan |
| 2010/0171021 | A1 | 7/2010 | Smith |
| 2011/0079619 | A1 | 4/2011 | Lewis |
| 2012/0236452 | A1 | 9/2012 | Oneill |
| 2013/0082963 | A1 | 4/2013 | Chu |
| 2013/0098957 | A1 | 4/2013 | Lee-Holowka |
| 2013/0200118 | A1 | 8/2013 | Johnson |
| 2013/0267283 | A1 | 10/2013 | Guzman |
| 2014/0092299 | A1* | 4/2014 | Phillips ................. H04N 5/2252 348/376 |
| 2015/0042877 | A1* | 2/2015 | O'Neill ................. H04N 5/2254 348/376 |
| 2015/0176937 | A1 | 6/2015 | Sullivan |
| 2015/0189133 | A1* | 7/2015 | Sandy ..................... H04N 5/44 348/376 |
| 2016/0006920 | A1 | 1/2016 | Gomes Da Motta et al. |
| 2016/0066085 | A1 | 3/2016 | Chang |
| 2016/0072540 | A1 | 3/2016 | Davis |
| 2016/0173667 | A1* | 6/2016 | Torres Gutierrez .... H04M 1/04 455/575.1 |
| 2016/0286156 | A1 | 9/2016 | Kovac |
| 2017/0111555 | A1 | 4/2017 | Davis |
| 2017/0111606 | A1 | 4/2017 | Davis |
| 2017/0142298 | A1 | 5/2017 | Fain et al. |
| 2017/0318202 | A1 | 11/2017 | Phillips |

FOREIGN PATENT DOCUMENTS

| | | |
|---|---|---|
| EP | 2533506 A1 | 12/2012 |
| EP | 3155926 A2 | 4/2017 |

OTHER PUBLICATIONS

Notice of Allowance issued in co-pending U.S. Appl. No. 14/847,224, dated May 23, 2018.
Non-final Office Action issued in co-pending U.S. Appl. No. 15/957,648, dated Nov. 19, 2018.
Partial European Search Report issued in European Application No. EP16194048, dated Jan. 4, 2017.
Extended European Search Report issued in European Application No. EP16194048, dated Apr. 4, 2017.
Non-final Office Action issued in co-pending U.S. Appl. No. 15/294,127, dated May 17, 2018 (17 pages).
Non-final Office Action issued in U.S. Appl. No. 14/847,224, dated Oct. 5, 2017 (7 pages).
Extended European Search Report issued in European Applicaiton No. EP 15184338.0 dated Mar. 24, 2016.
Communication forwarding Partial European Search Report issued in European application No. EP 15184338.0 dated Nov. 16, 2015.
Non-final Office Action issued in U.S. Appl. No. 15/294,039, dated Oct. 19, 2017 (8 pages).
Restriction Requirement issued in U.S. Appl. No. 15/957,648, dated Jul. 5, 2019.
International Search Report & Written Opinion issued in PCT/US2019/053838, dated Dec. 4, 2019.
Non-Final Office Action issued in U.S. Appl. No. 16/564,330, dated Dec. 6, 2019.

* cited by examiner

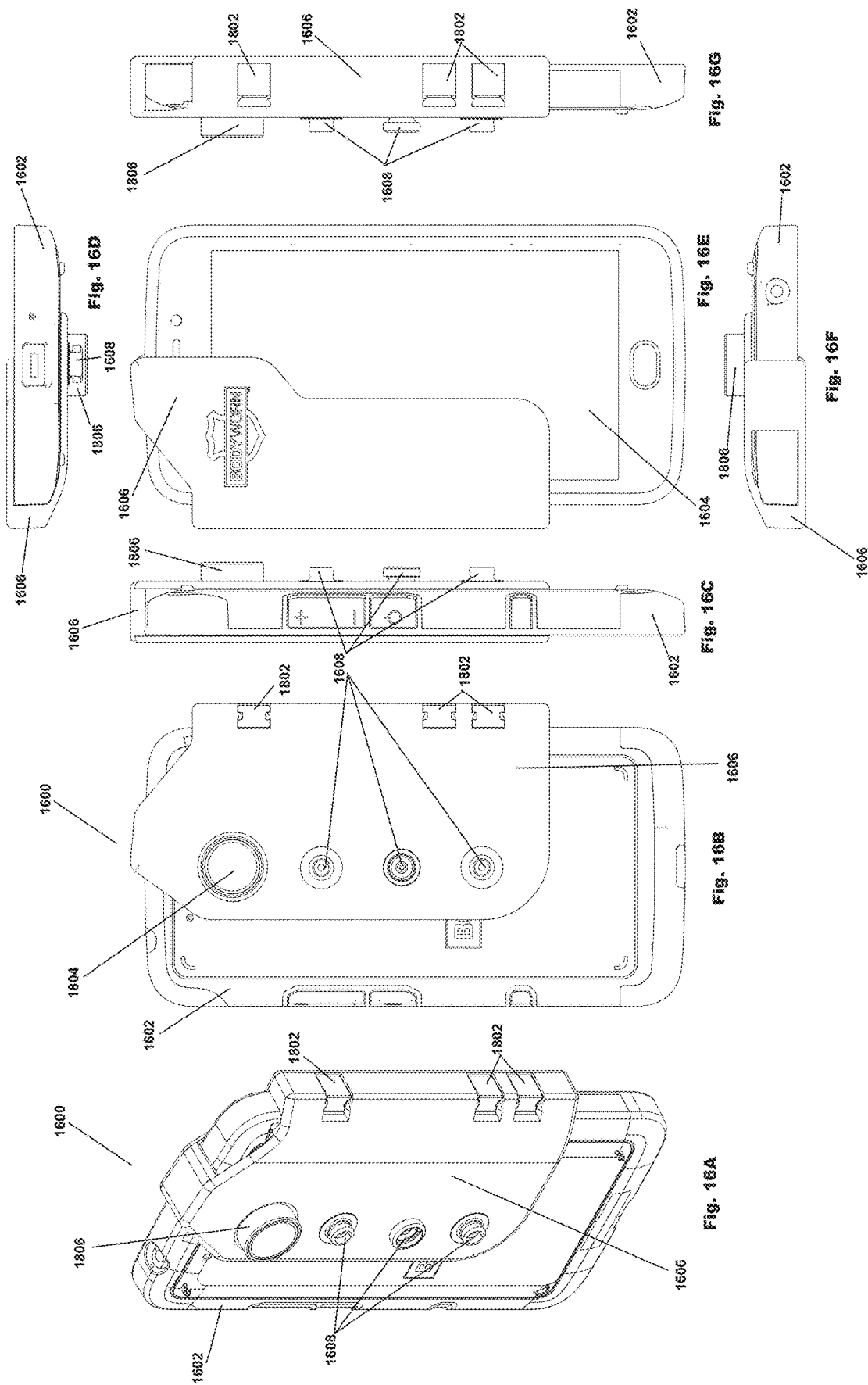

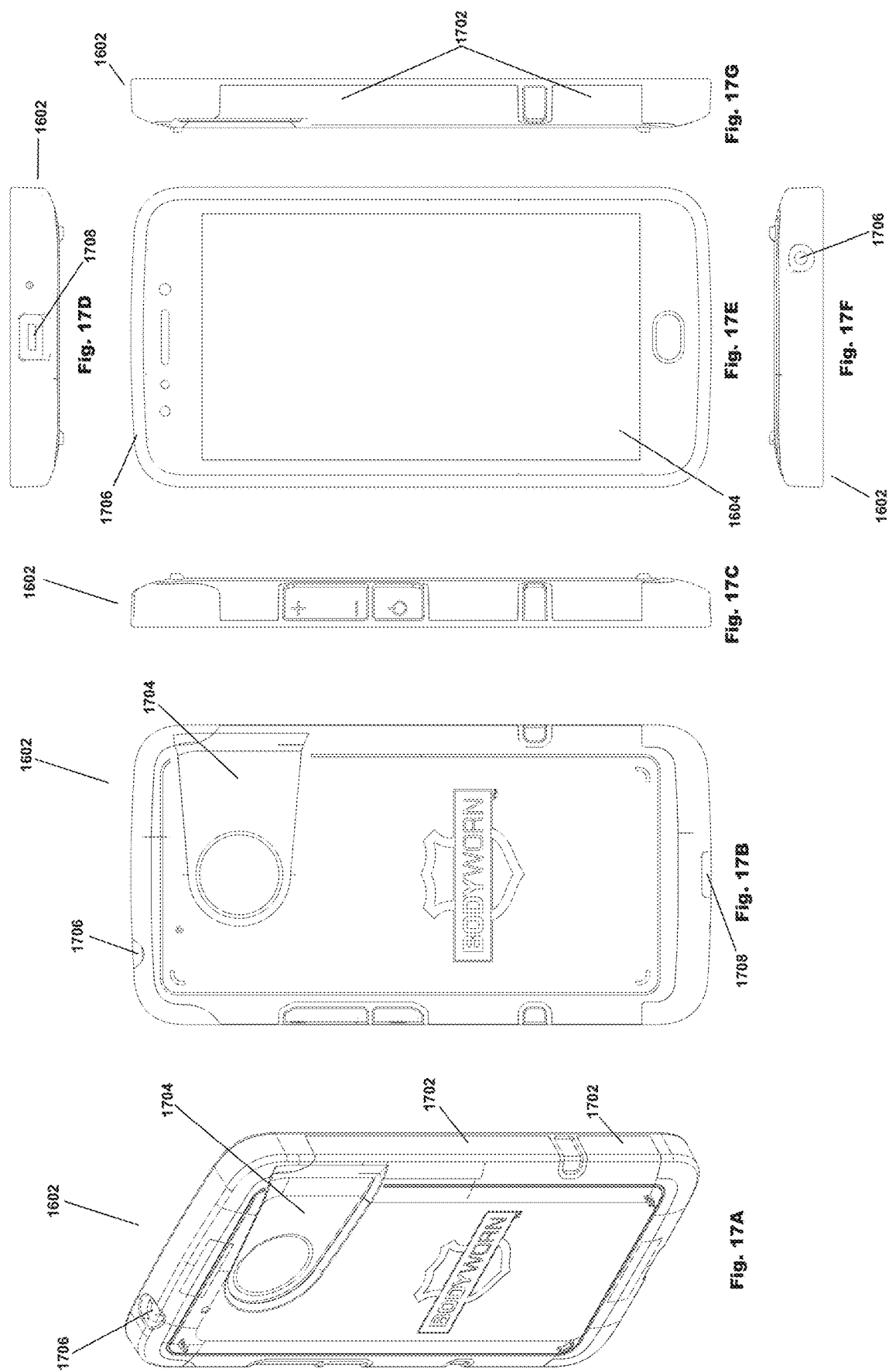

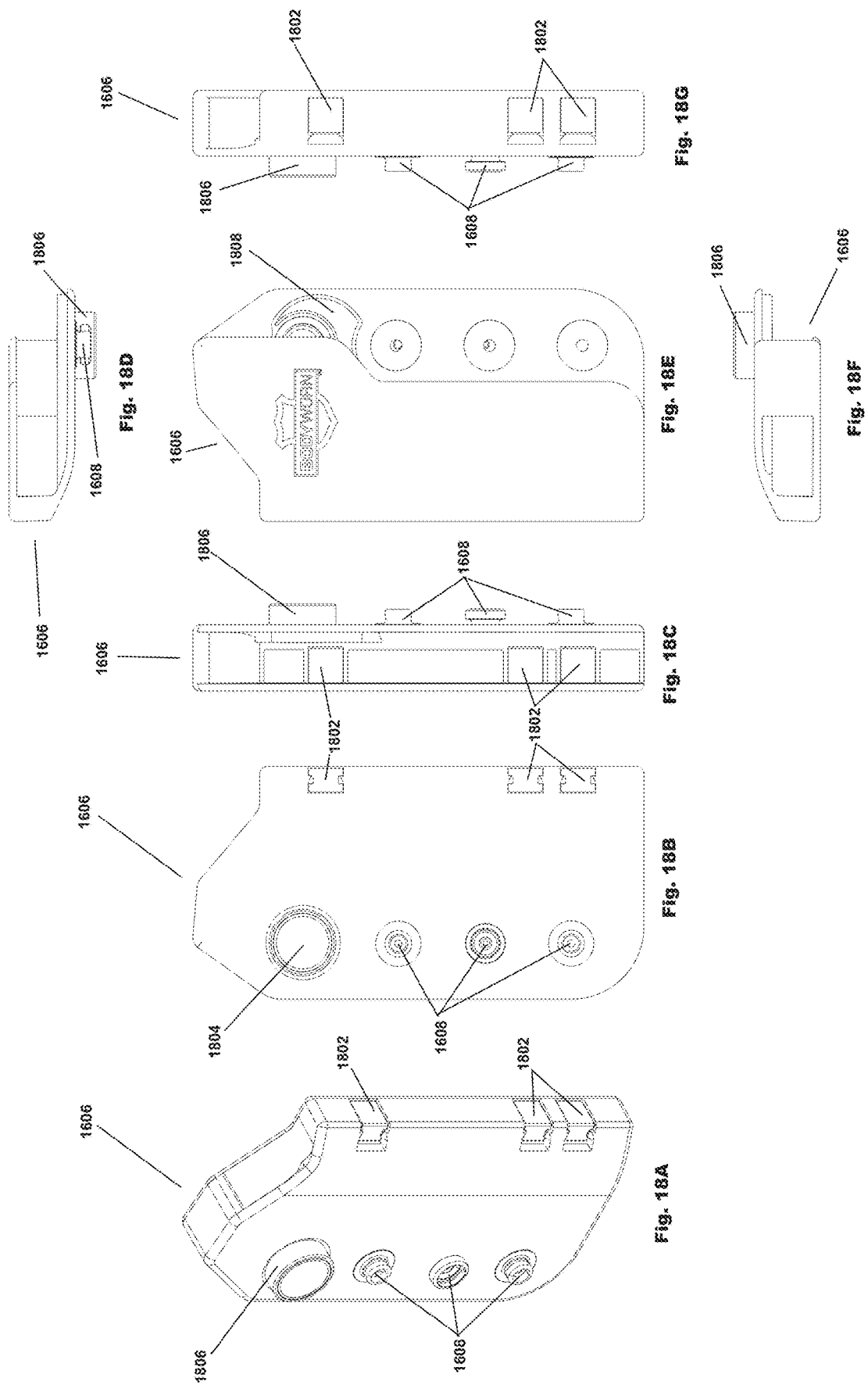

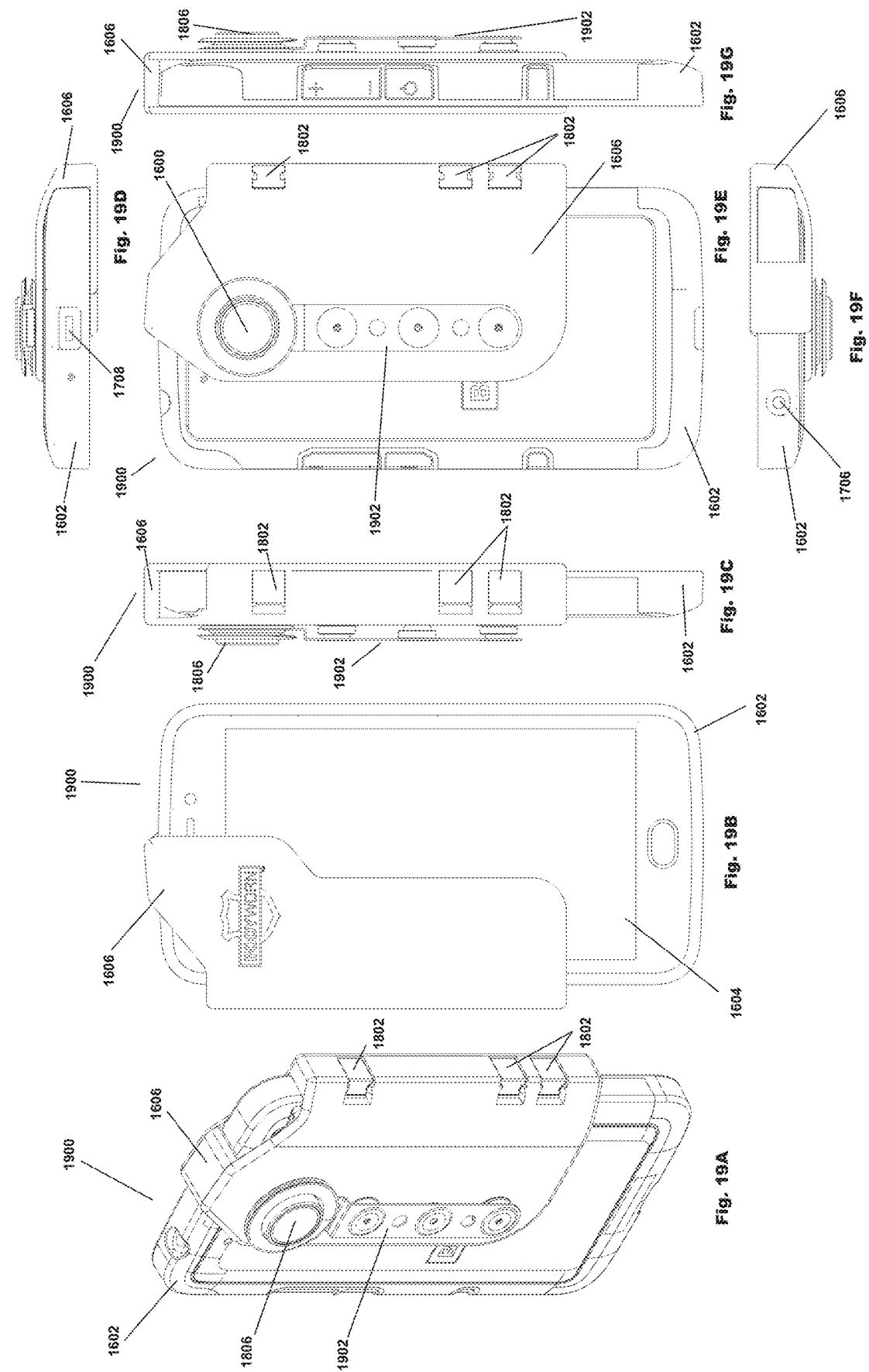

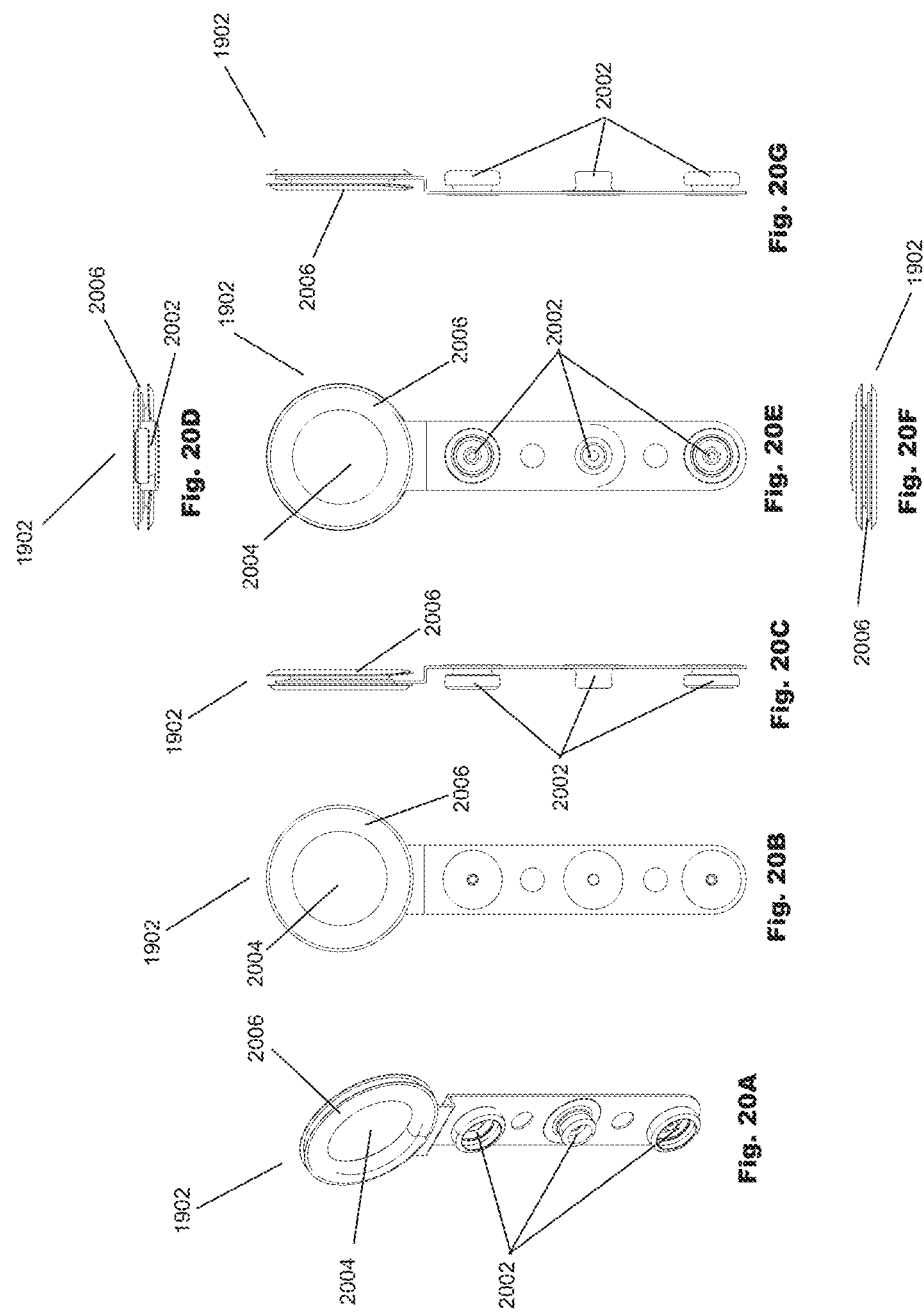

ARTICLE OF CLOTHING WITH VIDEO RECORDING DEVICE SUPPORT

CROSS REFERENCE TO RELATED APPLICATIONS

This application is a continuation-in-part of U.S. application Ser. No. 15/957,648 filed Apr. 19, 2018, which is a continuation of U.S. application Ser. No. 15/294,039 filed Oct. 14, 2016, which claims the benefit of priority to U.S. Provisional Application No. 62/241,536, filed Oct. 14, 2015, all of which are incorporated by reference herein in their entireties.

TECHNICAL FIELD

The present disclosure relates to a holster to hold a video and audio recording device within an article of clothing.

BACKGROUND

Video recording devices are being adopted by law enforcement agencies and other organizations to provide factual visual, audio, and metadata (such as date, time, latitude, longitude, temperature, and other metadata about the video, audio, and situation being captured) evidence of encounters with citizens and situations within view of the video recording device.

Early implementations of video recording devices were generally similar to GoPro and other consumer-oriented body-mounted recording devices. Such devices include manual on and/or off buttons to start and stop recording, are clipped-on to the outside of a uniform, are affixed or in some way attached to a user, and have a limited amount of video, audio, and/or metadata storage capacity. With specific reference to a law enforcement application, the data generally is captured and stored over the course of a shift. At the end of the shift the stored data is uploaded to a centralized video management system.

In some cases recording devices rely upon the user to operate a mechanical slide switch that physically covers the video camera lens when the device is manually switched to the "off" position. To turn the recording device on, a wearer or user must slide the switch to the "on" position. Other recording device examples depend upon the user to press one or more mechanical control buttons exposed on the front of the device to start recording, stop recording, mute audio, or otherwise manually control the operation of the video recording device. Such system control buttons are often small and front-mounted, facing away from the wearer's point of view. As a result, the wearer must attempt to feel for an on-off switch, and look down at the video recording device on their chest to ensure the correct button has been depressed, and/or to see that a status indicator light is illuminated.

Operating mechanical buttons may require the user to stop looking at a citizen, situation, or other potential threat in order to operate the video recording device. In the case of a law enforcement officer, looking away from one or more citizens involved in a situation can raise the risk of a situation turning into an incident, or worse yet result in law enforcement officer injury or death. The ideal case, and goal, is to avoid a situation turning into an incident.

Therefore, there would preferably be no recording device control action that requires the user to take their eyes off an existing situation to reliably operate the device.

Recording devices, often also referred to as video recording devices, also have mechanical buttons that are dedicated to the basic functions of turning the device on or off. It would be useful to be able to query the status of a video recording device for information such as fault codes, remaining video recording time, and remaining battery life. However, such additional status query capability would require additional buttons, or complicated sequences of button presses, that would be confusing and complicated for a user to operate reliably. The user would like the ability to validate that the video recording device has adequate remaining battery or recording capacity before responding to a situation, without operating a complicated sequence of control button presses, or removing the device from the front of a shirt, body armor vest carrier, or other clothing to look at a control screen or connect the unit via USB, WiFi, BlueTooth, Zigbee, or other wired or wireless data connection to another device where status information can be obtained.

Mechanical exposed buttons on a video recording device have great potential to be distracting and/or confusing to a highly stressed user. A user who is pre-occupied with a situation that could rapidly escalate into an incident, or when an incident is already in progress upon arriving on scene, should not also be subject to the additional stress and distraction of trying to operate mechanical control buttons. If there are exposed mechanical control buttons, there is the greater risk that the wrong button might be pressed at the wrong time. A recording may have been accidentally started earlier by an accidental press, or from the pressure of a seat belt across the chest pressing on control buttons on the front of an externally-mounted device, and a user may then activate the recording Start/Stop function, wrongly believing that the recording function had been activated when, in fact, it had been stopped. A video recording may not be started, or the user might inadvertently turn off the video recording or mute the audio recording just when it was needed most during an incident.

Exposed buttons and/or status indicator lights on the front, sides, top, or bottom of a recording device are plainly visible to a citizen facing the user. Therefore it is also possible for a citizen to be tempted to reach out and operate a control button to stop a recording or otherwise interfere with the operation of the device. An average citizen armed with a knife who is located within 21 feet of a police officer (the so-called Tueller Drill "21 Foot Rule") can charge and reach the officer before the officer would have time to react, bring a weapon to bear, and attempt to neutralize the threat. A citizen located within 21 feet of an officer could also charge, reach out, and attempt to press a front-mounted video recording device control button. A situation where there was more than one citizen located within 21 feet of a police officer would magnify this risk. A citizen acting on a temptation to attempt to turn off a video recording device would certainly turn a situation into an incident, which is to be avoided if at all possible. If the situation did devolve into an incident, the user might become involved in a struggle with one or more citizens, and an exposed control button might get accidently pressed through first blows or other bodily contact. This could stop the recording during middle of the incident. A video recording device with no exposed control buttons on the front, sides, top, or bottom of the device would minimize the temptations and risks presented by exposed control buttons. As a result, the wearer of the video recording device needs a way to control the device without having mechanical buttons exposed that a citizen could attempt to operate.

One alternative includes exposed manual control buttons on the back of the video recording device, which are not in view of the citizen. These buttons, however, would be difficult to operate. A user of a video recording device does not want to remove the device to operate controls to start or stop video recording, mute the device, or execute other commands. Exposed control buttons on the back of the video recording device would also be subject to accidental button presses through the device getting pressed by a seat belt or other forces that could accidentally press the device into the wearer's body. Exposed manual control buttons on the back of a video recording device would present great risk of device control commands being accidentally executed.

As a result, a recording device should not have any exposed mechanical control buttons that can be accidentally pressed by the wearer, come into contact with surfaces that accidentally operate a control button, or can be operated by a citizen involved in a situation or incident. The preferred device should reliably capture video, audio, and/or metadata. The preferred video recording device should not stop recording, be muted, or otherwise be inadvertently switched into an operating state when not consciously intended by the device user. Yet a user of a video recording device needs a way to positively control the device and get positive confirmation feedback of command execution without having to look at the video recording device, or press any exposed buttons.

Another problem with prior video recording devices is that they are generally manually assigned to a user (a police officer, etc.) through a video recording device serial number. The video recording device can also be associated with a person through a manual data entry process and that the device serial number or other ID number is entered into a database (such as a central control assignment database) that logically associates the device to a law enforcement officer or other wearer. However, there is often no validation or verification process or other technology to insure that the person who has physical possession of the video recording device is actually the same person the device is associated with in a central control assignment database. For example, Officer B could pick up and put on a video recording device that had been associated in a device assignment database to Officer A. As a result, video recorded by the device might be attributed to Officer A, when in fact the video recording captured by the recording device was actually captured by Officer B. Or it could be that the actual wearer of the device at the time the video was recorded might never be known with absolute certainty. There is a need for at least a one-factor authentication method that positively associates a video recording device to a specific person, or to another equipment item that is assigned to the specific person.

Law enforcement agencies and other organizations frequently provide or require officers, first responders, organization members or other persons associated therewith to wear a uniform. In the case of police officers, it is well known that officers typically wear a uniform that is recognized to evoke a sense of authority. In that environment, the integrity of the uniform must be maintained. Moreover, a police officer's uniform is already used to carry and support various gear. For example, a duty belt is used to secure a holster, a firearm, a tactical light, an oleoresin *capsicum* ("OC" or pepper) spray canister, walkie-talkie, ammunition and other gear.

In addition, as stated above, more and more officers are being asked or required to carry a recording device or other electronic devices. As a further example, it is known to provide officers with a combination radio microphone/speaker device that maybe attached to the uniform, typically a uniform shirt. Sometimes used in conjunction with an in-car video system, the microphone/speaker device may be attached to the uniform by means of a clip, a pin, or some other attachment device that positions the microphone/speaker device in a position to be readily grasped and used by the officer. Alternatively, the microphone/speaker device may be secured by a strap that can be attached to the epaulette or shoulder yoke strap of the uniform. One known device that allows for a combination microphone/speaker device to be attached to a uniform is referred to by the trademark "Walkieclip." With such devices, a mounting strap is secured to a button on the epaulette or the epaulette itself so as to hang down the front of the uniform shirt.

The mounting strap receives or accepts a clip or like attachment device on the back-side of the microphone/speaker device (or pin on the back of a holder for the device) so as to position the microphone/speaker at or near the breast pocket of the officer's uniform shirt.

Similarly, it is known to provide a clip, pin, or magnet that can be used to attach a video recording device to an officer's clothing. For example, a spring loaded clip attachment is known.

Such an attachment device receives the video recording device on one side, and includes a spring-loaded clip on the other side. The clip (or pin) allows the officer to attach the video recording device directly to the front of his or her uniform clothing.

Alternatively, it is known that a magnet might be placed on the outside of the uniform, or inside a shirt pocket. The video recording device may have a metal case or a metal plate, which will adhere to a magnet that is placed on the back of the plastic case of the video recording device. Alternatively, the magnet may be placed on the back of the video recording device, being careful that the magnet is not too strong to therefore erase recorded video or distort the electronic operation of the video recording device, and a metal plate is inserted into a pocket. The video recording device is affixed to the outside of the uniform through the attraction of the magnet to the metal plate.

Alternatively, it is known to provide a lanyard or like device that can be placed about the officer's neck to hold and support the video recording device. In that and the clip or pin methods of attachment, the video recording device's position may be disrupted, rendering it possibly useless or ineffective. If on a lanyard, the device's position may be altered simply by running. To be useful, the camera or video recording device would preferably be directed to the officer's front in a direction that would allow the camera to record or otherwise capture essentially what the officer is seeing.

There are disadvantages to attaching a video recording device to the outside of a uniform by such means. As noted, the device can be dislodged or detached from the uniform either intentionally by, for example, another party that seeks to interrupt recording, or unintentionally by sudden or violent movement of the officer. If the video recording device is dislodged, either the recording device or the uniform, or both, may be damaged. Even if not completely removed from the uniform, the video recording device can be inadvertently repositioned so that the camera is directed away from a desired field of view. In many instances, it is preferable to maintain the position of the camera in a substantially forward direction so as to capture what the officer is seeing or confronting. Even so, especially in a stressful situation, an officer may turn quickly to view an incident or in response to a stimulus. When attached to a uniform by a spring clip, pin, or magnet, or if on a lanyard, the video recording device may not turn or rotate in tandem with the officer. Rather, as a result of its own weight, the device may lag behind the officer and may not capture an event that the officer witnessed. The gravitational or "G" force of a rapid turn may be strong enough to detach the video recording device from the officer's uniform, causing the video recording device to go flying off in some unknown direction and location, and most likely not ending up in a position on the ground where the incident is within the recording field of view.

Still further, as stated above, an officer or other first responder in a high stress situation has little time or need to be concerned with proper placement, orientation and the workings of a camera or video recording device. For example, it would be difficult for an officer to manually activate a camera or other video recording device if he or she must respond quickly to a given circumstance. Rather, the officer's or first responder's first (and proper) focus is on the incident being addressed. It would be helpful to the officer or other first responder for the video recording device to be carried and secured in an effective and operative position so that the user need not be concerned with the device's attachment, orientation, or operation in a stressful or physically demanding situation. And, it would be potentially helpful to the officer or other person to maintain the video recording device in an operative position while maintaining both the structural integrity and appearance of the uniform so as to maintain the sense of authority and goodwill that is intended to be provided by the uniform in the first place.

It is more and more common that people use smartphones to record video, take photographs, and/or otherwise document events. Smartphones are plentiful, may be purchased off of the shelf, and are economical. Further, smartphones not only record video or take photographs, but also, for example, may be used to send and receive texts or picture messages, send and receive e-mails, access the Internet, and/or provide location services via GPS capabilities. On the other hand, standalone video recording devices are becoming less common and lack the capabilities of a smartphone.

One disadvantage to a typical smartphone, however, is the lack of a wide horizontal field of view for capturing video and/or taking photographs. Typical smartphones have small horizontal fields of view that either restrict the field of view and/or the object being recorded or photographed. It would have benefit and be economical to use a smartphone in place of standalone video recording devices; however, the horizontal field of view of a typical or standard smartphone would need to be increased in order to capture the necessary objects and evidence, especially in the field of law enforcement. Another disadvantage of a smartphone is that its microphone is extremely sensitive and reacts to different sounds and a vast range of volumes. With respect to the law enforcement field, the smartphone may, for example, interpret a car backfiring as a gunshot and begin recording based on a non-event. It would thus be useful to have a smartphone with capabilities of distinguishing a gunshot from other similar, loud sounds or noises.

To the Applicant's knowledge, until now, the focus on placing or securing recording devices, including a smartphone, to a uniform has been on attaching the device to the outside of a uniform. While this has proven effective in certain circumstances, there would be advantages to modifying a uniform itself to receive and support the device in an operative position. Moreover, it would be helpful if the position of the video recording device, and especially the camera of such a device, was maintained so as to best capture events that are being witnessed or experienced by the user. For example, repeated use of a microphone/speaker device does not necessarily result in a consistent position of the device. That may be acceptable for an audio only device, but it would be difficult to accept or even unacceptable for a video recorder or other camera. It would be useful for the video recording device to consistently be placed in a secure position that allows for the device to record, consistently, legal quality video data that can be authenticated and otherwise maintained for use in a courtroom environment. In addition, it would be an advantage for the smartphone to include a wide-lens to capture a wider horizontal field of view. It would be helpful to have an established, repeatable position for the video recording device that allows for the capture of such data in a consistent and reliable manner.

BRIEF SUMMARY

The present disclosure addresses providing an article of clothing that is able to receive and operatively support a recording device. This summary is provided to introduce certain concepts, to identify certain examples, and not necessarily to address all embodiments in accordance with the description of the invention herein and below. The description of exemplary embodiments is not intended to limit the scope of the invention as set forth in the claims.

In an exemplary embodiment, the present disclosure relates to an article of clothing that defines a compartment for operative receipt of a recording device. The compartment is preferably designed to include a view opening that is configured to allow an unobstructed field of view such that video data may be recorded and processed by the recording device while the recording device is supported within the compartment.

In another exemplary embodiment, the present disclosure relates to a system including an article of clothing and a video recording device. The article of clothing may define a compartment to receive components of the system or may itself support system components. Such components may include a holster retained within the compartment or otherwise within the article of clothing itself. The holster may be configured for receipt of the video recording device and be suitable for insertion into and retention within the compartment or inside of the article of clothing.

In another exemplary embodiment, the present disclosure relates to a system including an article of clothing and a video recording device wherein the article of clothing may define a compartment and the system may include a holster and a retaining member. The retaining member may be configured to be supported by the article of clothing within the compartment or on the inside surface of the clothing, and the retaining member may be configured to receive and support the holster, while in turn the holster may be configured to receive and support a recording device.

In another exemplary embodiment, the present disclosure relates to a system including an article of clothing and a recording device wherein the article of clothing may define a compartment and the system may include a carrier or case for receipt of the recording device, a holster for receipt of the carrier or case containing the recording device, and a retaining member to suspend or retain the carrier and recording device from or within the article of clothing in such a manner that the recording device is able to record events through an unobstructed view opening in the article of clothing.

In another exemplary embodiment, the present disclosure relates to a device for holding a video and recording apparatus is shown, which may include a smartphone, the device including a carrier that receives a smartphone, and the carrier defines a metal portion. The device further includes a holster that receives said carrier, and the holster includes a magnetic element and a view hole to allow video to be recorded by the smartphone, and the view hole includes a wide-angle lens and is positioned so as to be aligned with a camera or recording device of the smartphone. Further, the magnetic element of the holster, in combination with said metal portion of said carrier, acts to urge said carrier into said holster and registers said carrier within said holster.

In another exemplary embodiment, the present disclosure relates to a device for removably securing a video and recording apparatus, which may include a smartphone, within or inside an article of clothing. The device includes a carrier that receives a smartphone, and the carrier defines a metal portion. The device further includes a holster that receives said carrier, and the holster includes at least one fastener, a magnetic element, and a view hole to allow video to be recorded by the smartphone, and the view hole includes a wide-angle lens and is positioned so as to be aligned with a camera or recording device of the smartphone. In addition, the magnetic element of the holster, in combination with said metal portion of said carrier, acts to urge said carrier into said holster and registers said carrier within said holster. The device also includes a retaining plate, which includes at least one fastener for securing said holster to said retaining plate via the at least one fastener of the holster, whereby the holster may be fastened to said retaining plate, and said smartphone is placed into said carrier, which is in turn placed into said holster such that the smartphone is attached to or within or inside an article of clothing.

In another exemplary embodiment, the present disclosure relates to a method of securing a video and recording apparatus, which may include a smartphone, within or inside an article of clothing. The method includes providing a device for holding a smartphone. The device for holding the smartphone includes a carrier that receives the smartphone, and the carrier defines a metal portion. The device for holding the smartphone also includes a holster that receives said carrier, and said holster includes at least one fastener, a magnetic element, and a view hole to allow video to be recorded by the smartphone, with the view hole including a wide-angle lens and positioned so as to be aligned with a camera or recording device of the smartphone. The method also includes providing a smartphone for the carrier and receiving the carrier within the holster. Further, the method includes providing a retaining plate, and the retaining plate defines a view opening and includes at least one fastener for securing said holster to said retaining plate via the at least one fastener of the holster, whereby the holster may be fastened to said retaining plate. The exemplary method also includes providing an article of clothing that defines a compartment for receipt of the carrier, the holster, and the smartphone. The method further includes defining a view opening on the article of clothing whereby the view opening of the retaining plate is aligned with the view opening in said article of clothing to maintain an unobstructed path between said smartphone and wide-angle lens and an exterior of said article of clothing by way of said view opening in said retaining plate and said view opening in said article of clothing. The method further includes recording video and collecting video data.

Other aspects, features and advantages will be apparent from a review of the detailed description in conjunction with the accompanying drawings.

BRIEF DESCRIPTION OF THE DRAWINGS

FIG. 16A is a perspective view of an exemplary device for holding a video and recording apparatus is shown.

FIG. 16B is a rear view of an exemplary device for holding a video and recording apparatus is shown.

FIG. 16C is a side view of an exemplary device for holding a video and recording apparatus is shown.

FIG. 16D is a bottom view of an exemplary device for holding a video and recording apparatus is shown.

FIG. 16E is a front view of an exemplary device for holding a video and recording apparatus is shown.

FIG. 16F is a top view of an exemplary device for holding a video and recording apparatus is shown.

FIG. 16G is a side view of an exemplary device for holding a video and recording apparatus is shown.

FIG. 17A is a perspective view of an exemplary carrier for a video and recording apparatus is shown.

FIG. 17B is a rear view of an exemplary carrier for a video and recording apparatus is shown.

FIG. 17C is a side view of an exemplary carrier for a video and recording apparatus is shown.

FIG. 17D is a bottom view of an exemplary carrier for a video and recording apparatus is shown.

FIG. 17E is a front view of an exemplary carrier for a video and recording apparatus is shown.

FIG. 17F is a top view of an exemplary carrier for a video and recording apparatus is shown.

FIG. 17G is a side view of an exemplary carrier for a video and recording apparatus is shown.

FIG. 18A is a perspective view of an exemplary holster.

FIG. 18B is a rear view of an exemplary holster.

FIG. 18C is a side view of an exemplary holster.

FIG. 18D is a bottom view of an exemplary holster.

FIG. 18E is a front view of an exemplary holster.

FIG. 18F is a top view of an exemplary holster.

FIG. 18G is a side view of an exemplary holster.

FIG. 19A is a perspective view of an exemplary device for removably securing a video and recording apparatus is shown within an article of clothing.

FIG. 19B is a rear view of an exemplary device for removably securing a video and recording apparatus is shown within an article of clothing.

FIG. 19C is a side view of an exemplary device for removably securing a video and recording apparatus is shown within an article of clothing.

FIG. 19D is a bottom view of an exemplary device for removably securing a video and recording apparatus is shown within an article of clothing.

FIG. 19E is a front view of an exemplary device for removably securing a video and recording apparatus is shown within an article of clothing.

FIG. 19F is a top view of an exemplary device for removably securing a video and recording apparatus is shown within an article of clothing.

FIG. 19G is a side view of an exemplary device for removably securing a video and recording apparatus is shown within an article of clothing.

FIG. 20A is a perspective view of an exemplary retaining plate.

FIG. 20B is a rear view of an exemplary retaining plate.

FIG. 20C is a side view of an exemplary retaining plate.

FIG. 20D is a bottom view of an exemplary retaining plate.

FIG. 20E is a front view of an exemplary retaining plate.

FIG. 20F is a top view of an exemplary retaining plate.

FIG. 20G is a side view of an exemplary retaining plate.

DETAILED DESCRIPTION

Before embodiments of the present disclosure are described in detail, it is to be understood that the apparatus, methods and systems are not limited to specific methods, specific components, specific feature, specific systems or particular compositions. The terminology used herein is for the purpose of describing particular embodiments only and is not intended to be, and is not, limiting. The term "exemplary" means "an example" or an "example of" and is not meant to convey a meaning of an ideal or a preferred embodiment or feature. The term "such as" is merely explanatory and indicative that any recited items are examples of what is covered by a stated feature or provision; it is not intended to be restrictive.

Further, this disclosure is of components and features that can be used to perform the disclosed methods, apparatus or systems. When combinations, subsets, interactions, groups, etc. of such components are disclosed, even when reference is not explicitly made to all possible combinations or permutations, each is contemplated and described for all methods, apparatus and systems. This applies to all aspects of the disclosed invention, including method steps. Thus, if additional steps may be performed, it is understood that such additional steps may be performed with a specific disclosed embodiment or combination of embodiments.

The present disclosure provides a system for supporting a recording device within or inside an article of clothing.

Figure 1:
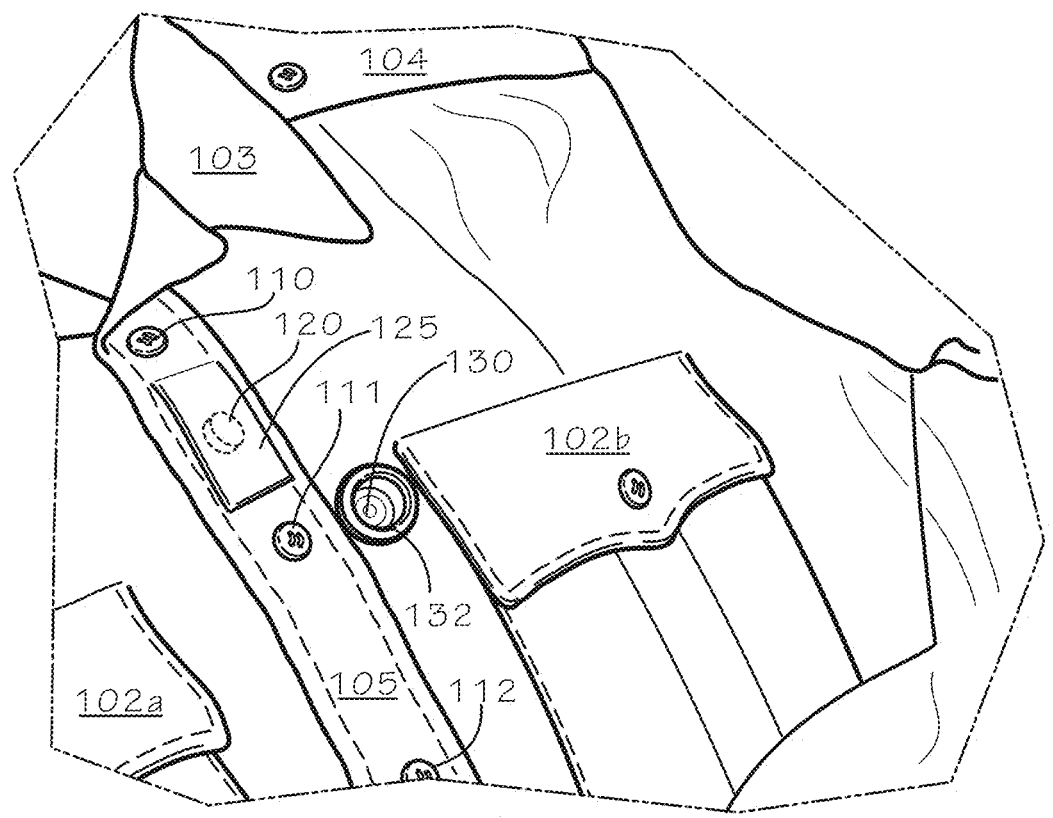
FIG. 1 is a perspective view of an exemplary system showing an article of clothing with a recording device.
Figure 2:
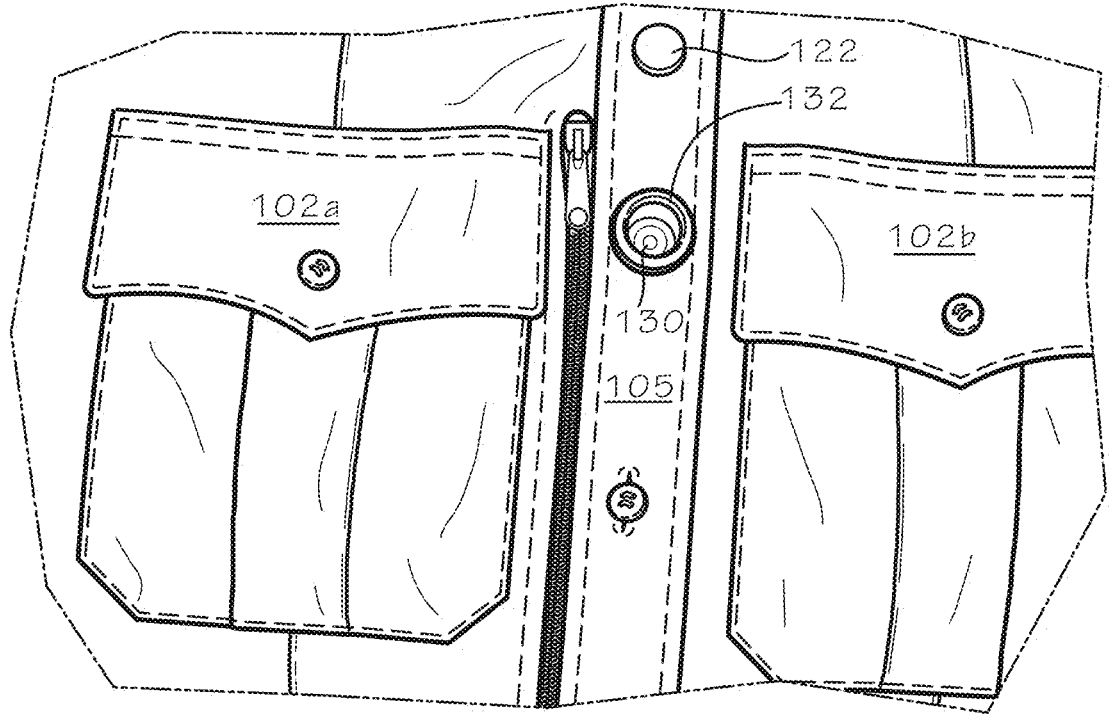
FIG. 2 is a perspective view of an exemplary system showing an article of clothing with a recording device.
Figure 3:
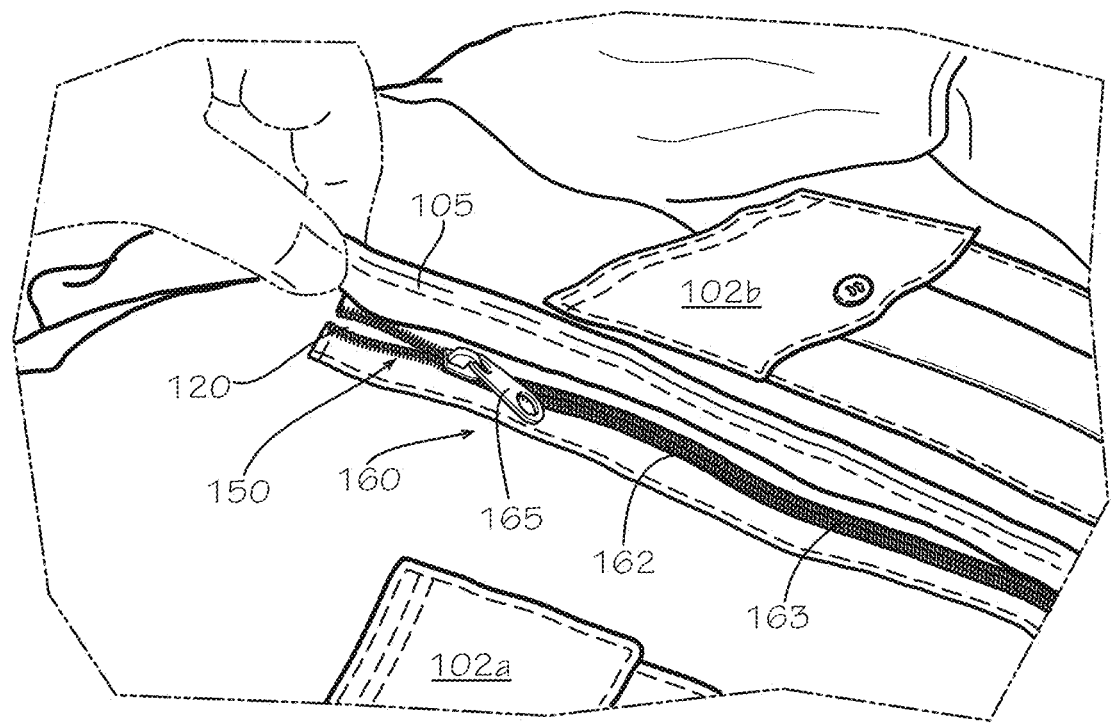
FIG. 3 is a perspective view of an exemplary system showing an article of clothing with a recording device showing the placket and a portion of the underside of that placket.

FIG. 1 is a perspective view of an article of clothing, namely, a shirt 100. It will be understood that the disclosure herein is applicable to other articles of clothing, including but not limited to vests, jackets and pants. The shirt 100 is thus exemplary of an article of clothing suitable for use in the present disclosure. The shirt 100 includes two breast pockets 102a and 102b, a collar 103 and an epaulette 104 at the shoulder. The shirt 100 further defines a placket 105 that supports and receives a series of buttons 110, 111 and 112 in a conventional manner. The placket 105 includes a rivet 120 that extends from the inside of the shirt 100 to the exterior of the placket 105, and rests between the buttons 110 and 111. The person of ordinary skill will appreciate that the rivet 120 may be utilized to secure a retaining plate as described herein, and may also comprise a grommet, snap, stud, post or other suitable fastener. The rivet 120 may, but need not be covered by a loop or piece of material 125. The loop or piece of material 125 may be secured in any suitable manner, including sewing or stitching the material to secure its position, or by cooperating hooks and loops (i.e., "Velcro"), or by grommets, or by any other suitable means that allows for meaningful access to rivet 120. The rivet 120 is covered with a cap 122 that extends immediately above the placket 105. (An exemplary cap 122 is shown in FIG. 2.) The person of ordinary skill will appreciate that the cap 122 and the material overlay 125 may be provided for both mechanical and aesthetic reasons, as the integrity of the garment is a consideration, especially where the clothing is a uniform that evokes a sense of authority.

The placket 105 of shirt 100 further defines a view opening 130 created by an open ring or grommet 132 secured between the placket 105 and the breast pocket 102b. The grommet 132 may be secured in a conventional manner, including by clamping, glue, stitching, hammer or any other suitable mechanism. The grommet 132 may be made of any suitable material including metal, plastic and rubber. The size of the view opening 130 is determined by the size of the grommet 132, and is configured to cooperate with a video recording device 200. In an exemplary embodiment, the view opening 130 is of a size suitable for a lens 202 of a camera (a recording device 200) to shoot video and otherwise capture data without obstruction as explained in greater detail herein. It will be understood by the person of ordinary skill that the lens 202 of a video recording device 200 preferably sits behind and is aligned with the view opening 130 so that an unobstructed path is created for the capture and collection of video evidence that may be authenticated and is otherwise sufficiently obtained and maintained for use in a legal proceeding.

Further, it will be appreciated that the view opening 130 may be positioned as desired in the article of clothing. As shown in FIG. 1, the view opening 130 is between the placket 105 and the breast pocket 102(b). Referring to FIG. 2, it is seen that the grommet 132 has been placed in the placket 105 such that the view opening 130 is within the placket. Consistent with the present disclosure, the view opening 130 as defined by the grommet 132 can be placed at any suitable place on the shirt 100 or other article of clothing.

Figure 4:
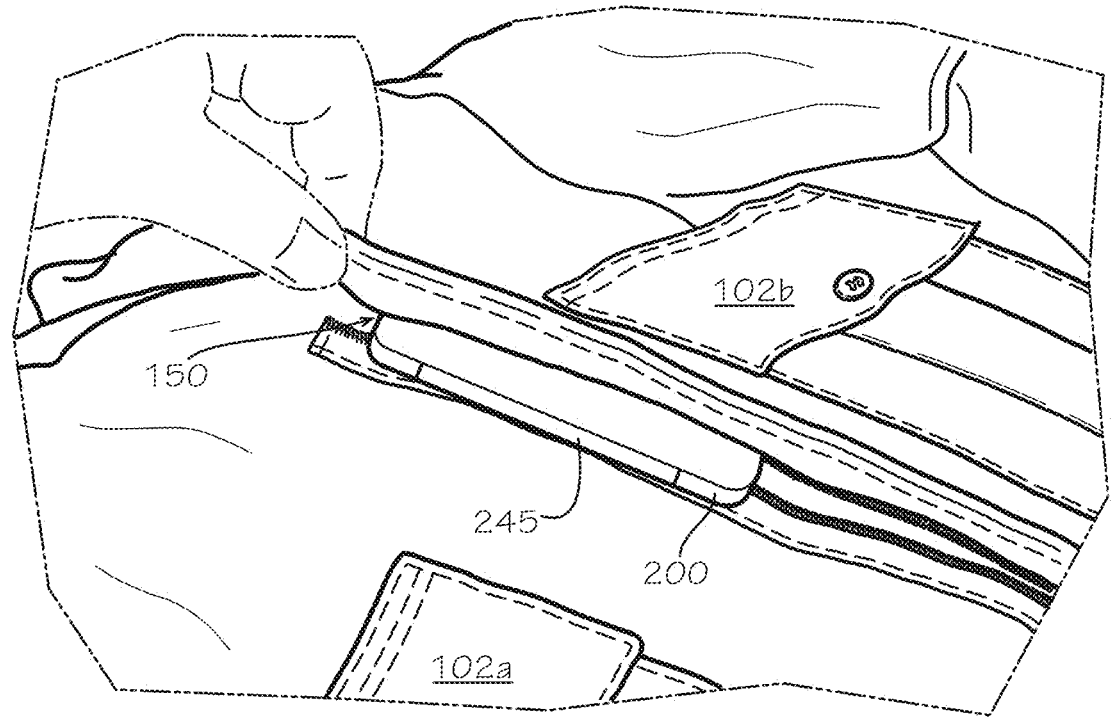
FIG. 4 is a perspective view of an exemplary system showing an article of clothing with a carrier and a recording device partially inserted into a compartment within the article of clothing.
Figure 5:
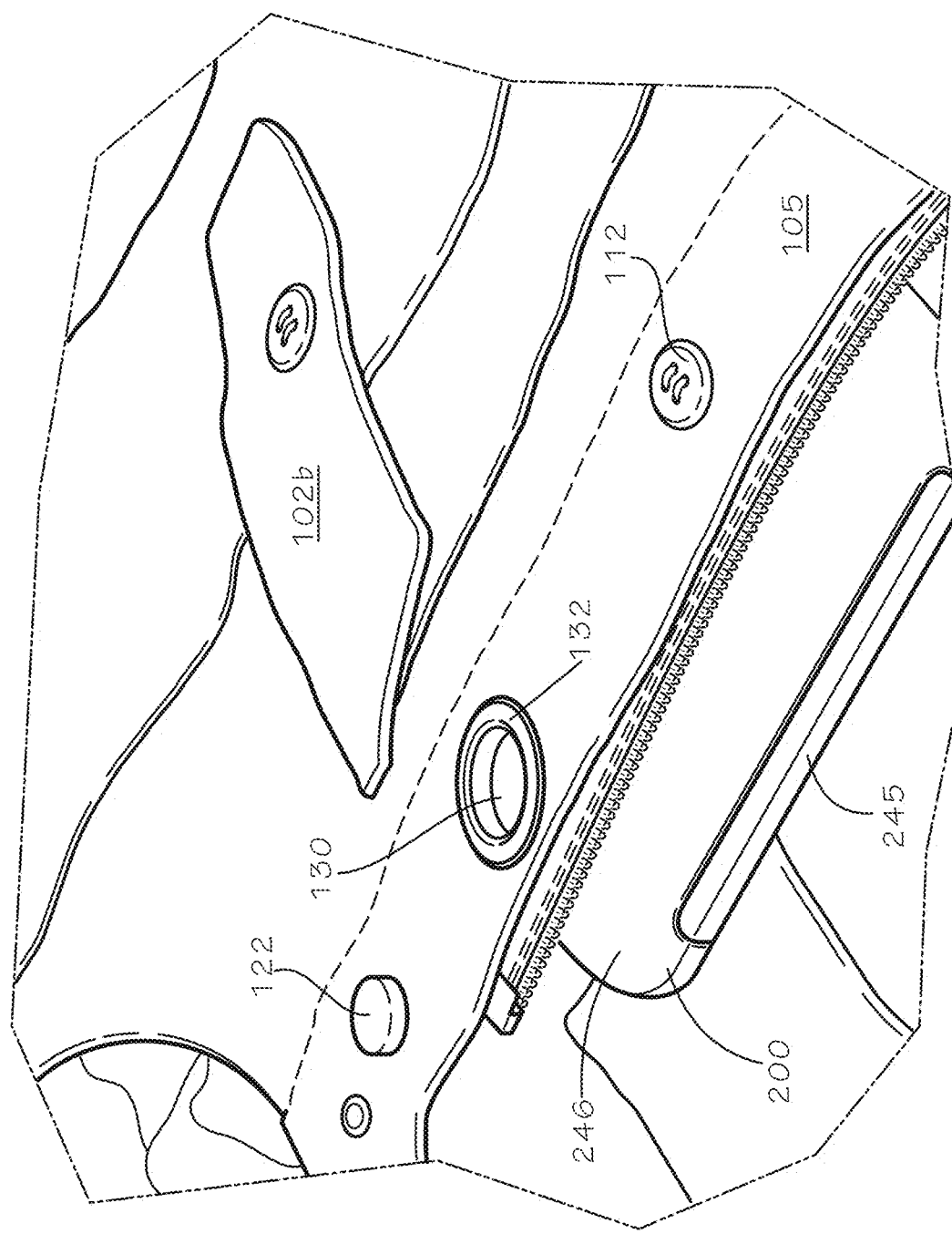
FIG. 5 is a perspective view of an exemplary system showing an article of clothing with a carrier and a recording device partially inserted into a compartment in the article of clothing.

The shirt 100 defines an interior side that may include a compartment 150. The compartment 150 may be defined by a liner or other portion of material 153 and the interior of the shirt 100. Alternatively, as disclosed herein, the inside or interior of the shirt 100 may be used to provide support for the components of the disclosed system. It should therefore be recognized that the liner 153 is not necessary, but can provide a comfort layer of material between disclosed components of the system and the skin of an officer, first responder or other person wearing the article of clothing 100. At one end, the edge of the compartment 150 is defined by a zipper 160. If a compartment 150 is not provided, the zipper 160 may be utilized to provide ready access to the interior of the shirt 100 and the components of the disclosed system as described herein. Of course, other access methods (such as buttons, snaps, etc.) may be utilized. The zipper 160 includes a pair of teeth 162 and 163 that may be joined or separated by operation of a pull tab 165. By operation of the pull tab 165, the teeth 162 and 163 may be either engaged or disengaged to respectively close or open the compartment 150. The compartment is defined at an opposing end by the position of a holster that is described in more detail below. The holster thus rests within the compartment 150. More specifically, the compartment 150 may be sized so as to retain the holster which receives a recording device 200 as disclosed in greater detail herein. See FIGS. 4 and 5.

Figure 6:
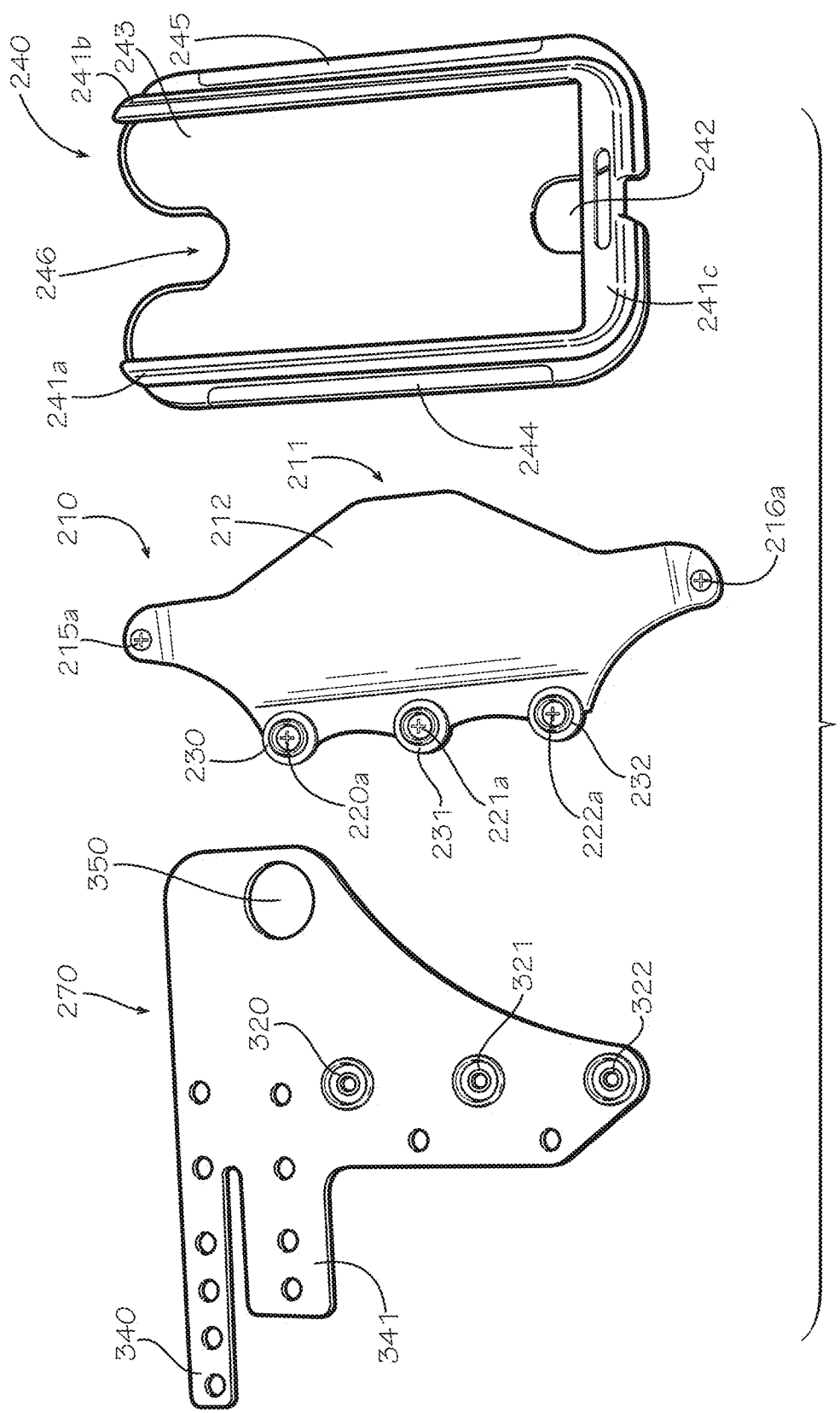
FIG. 6 is a perspective view of a carrier, a holster and a retaining member suitable for use in a disclosed system.
Figure 7:
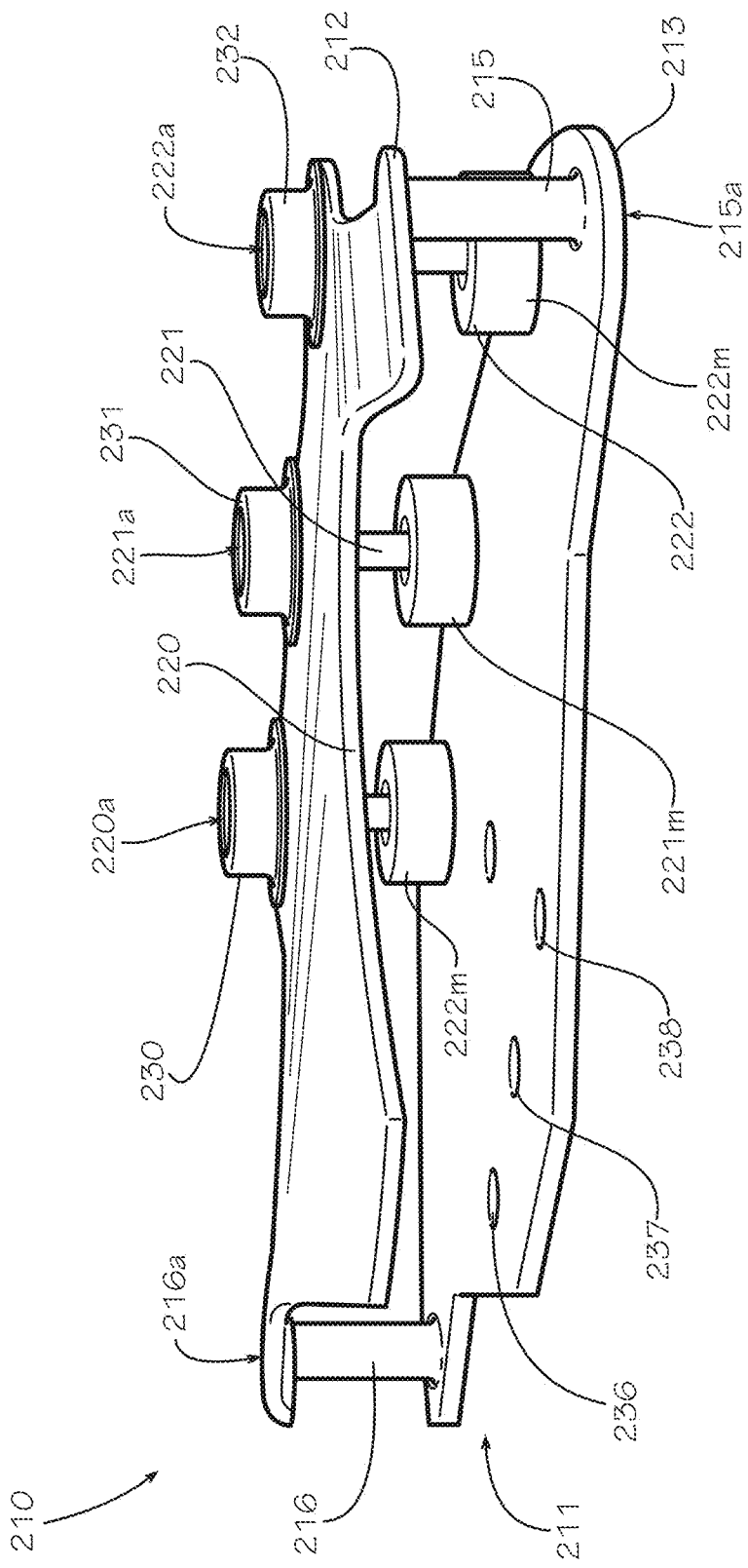
FIG. 7 is a perspective side view of a holster suitable for use in a disclosed system.

FIGS. 6 and 7 show, in addition to other components, an exemplary holster 210 in isolation. The holster 210 may be made of any suitable material, and is preferably, but not necessarily, of a fairly rigid construction. Suitable materials include steel, plastic, aluminum and any other material sufficient to support the components of the system as described herein. The holster 210 serves as a form of mounting bracket, and has two plates 212 and 213 that are secured by a pair of posts 215 and 216. The posts 215 and 216 may be integral to either or both of the plates 212 and 213. More particularly, the posts 215 and 216 may be secured using threaded members 215a and 216a that extend through their respective posts 215 and 216 using a "PEM" fitting or other self-clinching fastener. The person of ordinary skill will appreciate that such a fastener may be (as shown) a flush fastener 215a and 216a (FIG. 12) and acts as a spacer to maintain plates 212 and 213 as a set distance apart one from the other. Thus, it may be appreciated that the posts 215 and 216 sit about the respective threaded members 215a and 216a to hold the position of the plates 212 and 213, and that the fasteners 215a and 216a may be clinch fittings. Once the clinch fittings 215a and 216a are secured, the respective posts 215 and 216 may be threaded to the clinch fittings 215a and 216a. Alternatively, the posts 215 and 216 may be separate components secured to the plates 212 and 213 by any suitable method, including a conventional bolt or screw or fastener or other mechanism.

Figure 12:
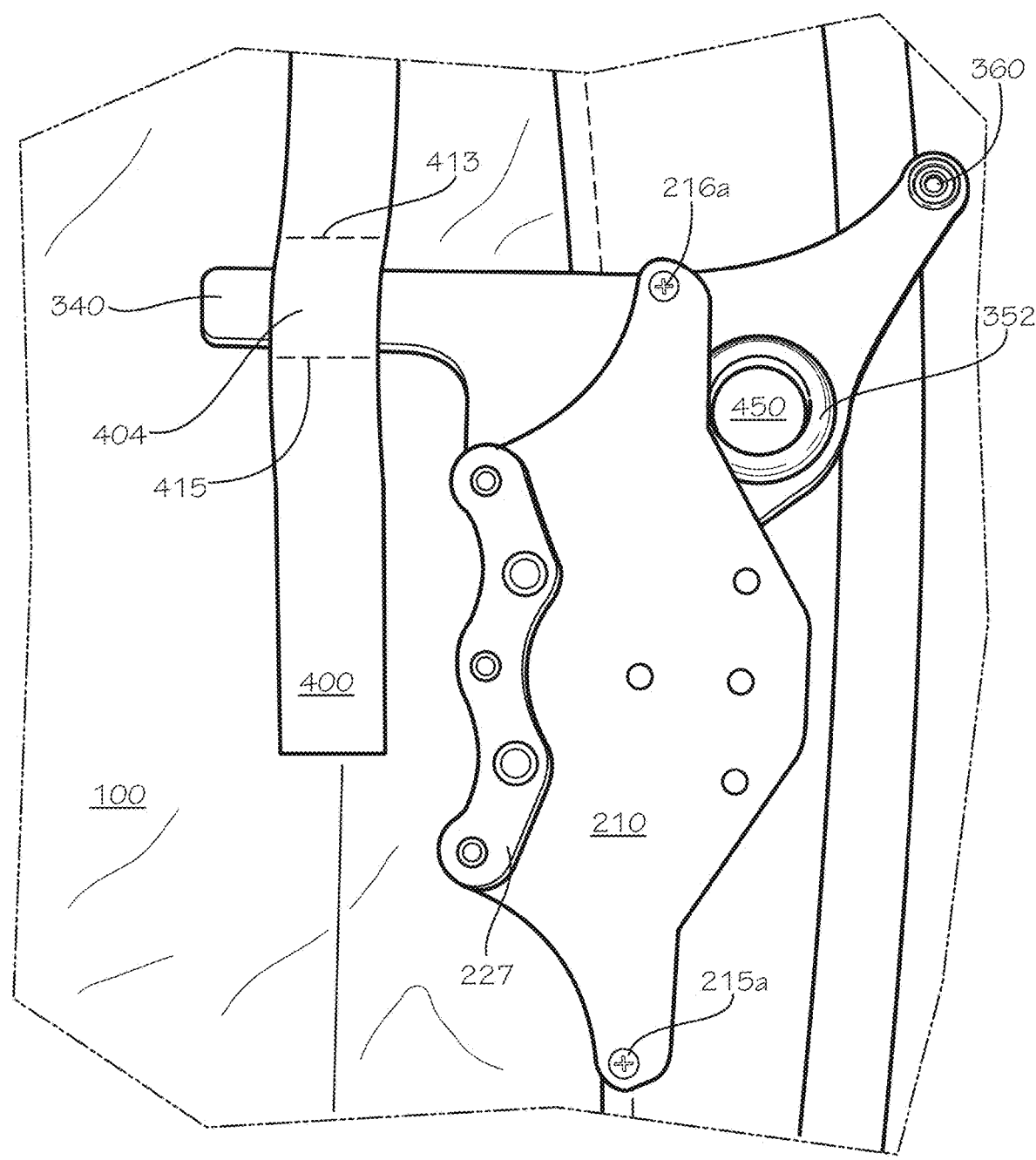
FIG. 12 is a plan view of a system showing a retaining member and a holster supported by an article of clothing, also showing a plate of the holster.
Figure 13:
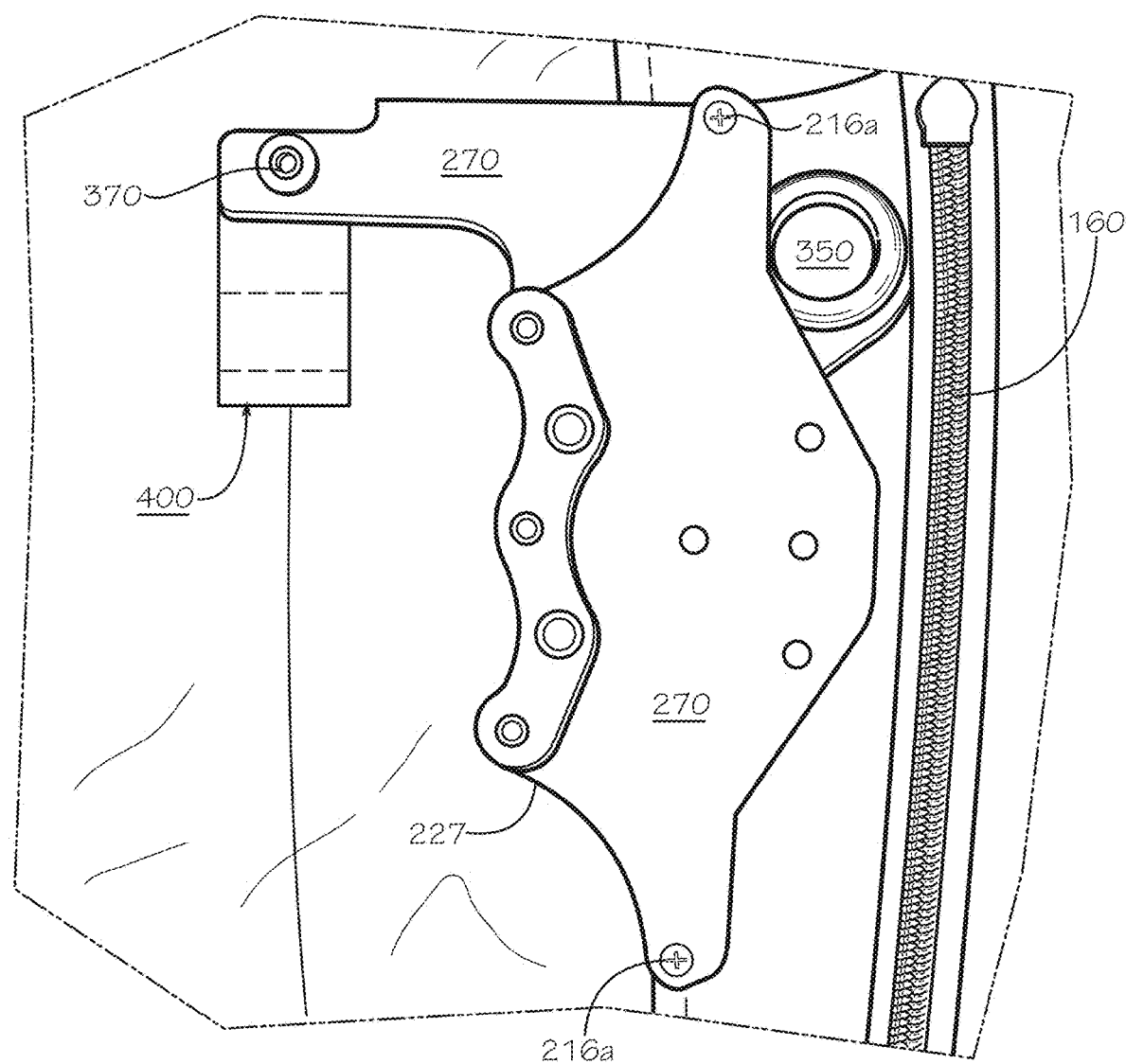
FIG. 13 is a perspective view of a system showing a holster, a carrier, and a retaining member supported in the interior of an article of clothing.

The holster 210 may be sized and configured to receive and contain the recording device 200, which may be placed in a carrier or case 240 as described below. The posts 215 and 216 define two end points that preclude movement of the recording device 200 beyond the position of the posts 215 and 216. The holster 210 further includes three posts 220, 221 and 222, that may be integral to the plates 212 and 213 or separately formed using flush, clinching fasteners as with the posts 215 and 216. The posts 220, 221 and 222, which may be made of stainless steel, may be secured by respective threaded members 220a, 221a and 222a as described above. It will be further noted that posts 220, 221 and 222 support circular magnets 220m, 221m and 222m. The magnets 220, 221m and 222m may be fixed in a location, resting against place 213. If desired, plate 213 may be configured with a cut-out so as to retain the magnets 220m, 221m and 222m in a given position. To retain both the posts 220, 221 and 222 and the magnets 220m, 221m and 222m, the threaded members 220a, 221a and 222a terminate a plate 227 (See, for example, FIG. 12). Again the threaded fasteners 220a, 221a and 222a may be secured to the plate 227 by a PEM or other clinch fastener so that it is a flush fastener arrangement as shown in FIGS. 12 and 13. The posts 220, 221 and 222 thus likewise define a boundary beyond which the recording device 200 and carrier 240 cannot pass, as described herein.

Thus, it will be understood that the holster 210 receives the recording device 200 in such a manner that the posts 215, 216, 220, 221 and 222 act as stops that contain and position the recording device within the compartment 150. Moreover, as described herein, the magnets 220m, 221m and 222m are positioned to operatively engage and retain the carrier 240 by means of a magnetic strip 244 described in greater detail below. Moreover, it will be appreciated that the magnets 220m, 221m and 222m create a magnetic field, a region of charged particles that can be detected and measured. The magnetic field created can be used, as stated herein, to determine if the video recording device 200 has been properly docked or registered within the article of clothing 100. The initial information of a proper registration or docking of the video recording device 200 (or "smartphone" or other like device with onboard intelligence) can be utilized to provide features and information to the user as described below. Thus, the magnets 220m, 221m and 222m provide benefit in that, in combination with the carrier 240, they assist in securely retaining a video recording device 200 within the holster 210. In addition, the magnets 220m, 221m and 222m also allow for the device 200 to detect a docked state and provide additional information to a user.

Figure 8:
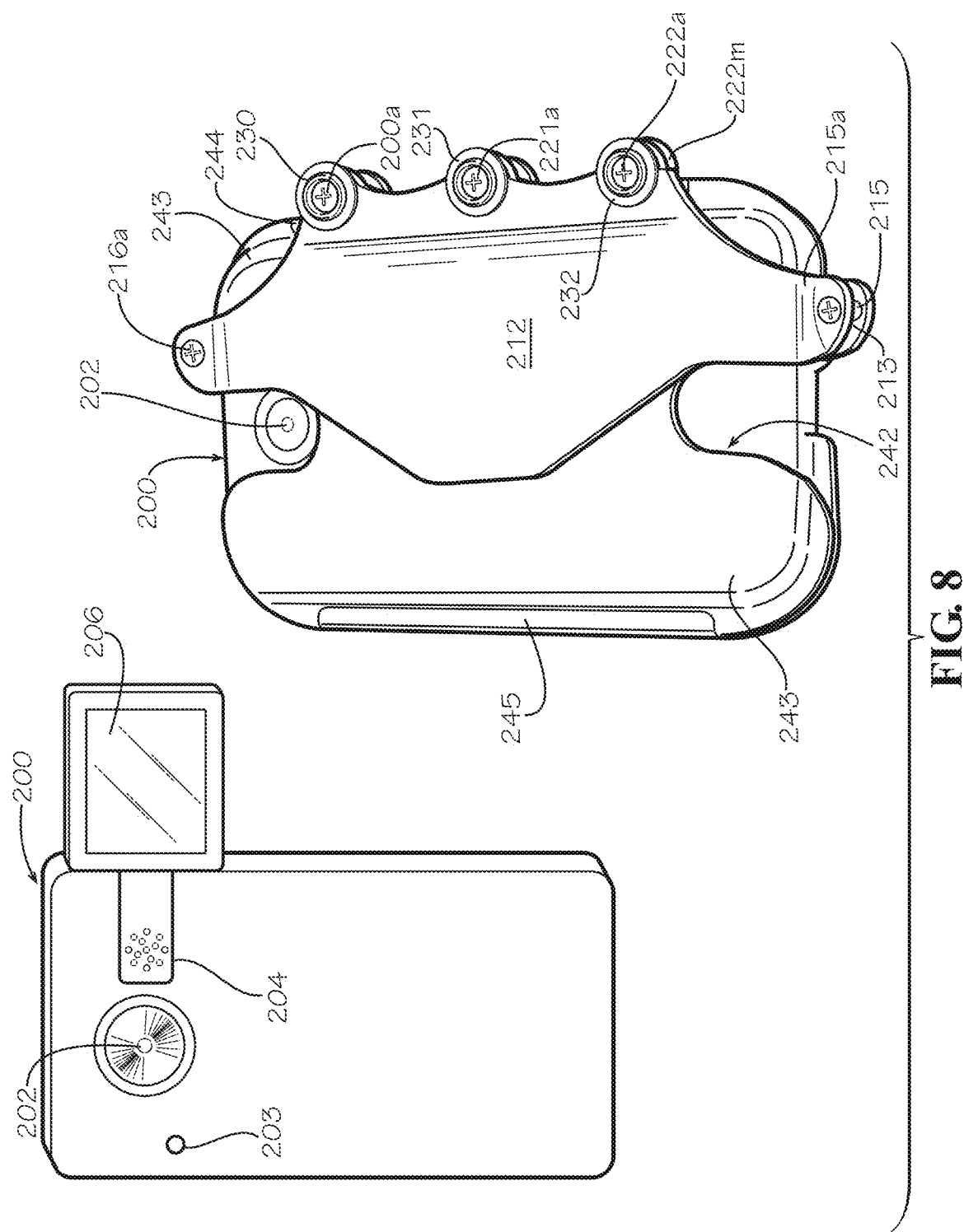
FIG. 8 is a perspective view of a holster, and a carrier suitable for use in a disclosed system.

As shown in FIGS. 6 and 7, the holster 210 defines an open end 211 suitable for receipt of a recording device 200. On the opposing side of plate 212, the posts 220, 221 and 222 terminate and support respective male snap elements 230, 231 and 232. The male snap elements 230, 231 and 232 include studs that project outwardly of plate 212 in a position to engage a retaining plate 270 as explained below. It will be appreciated that the posts 220, 221 and 222 and their respective threaded members 220a, 221a and 222a project through openings in plate 212 to engage the base of the snaps 230, 231 and 232 (FIG. 8). Similarly defined openings 236, 237 and 238 are shown in plate 213 of the holster 210. Further, the plate (see FIG. 12) may likewise define openings that are threaded so as to facilitate a clinch fitting as well. Thus, by virtue of the posts 215, 216, 220, 221, and 222, the position of plate 212 relative to plate 213 is substantially fixed. Further, by virtue of the open end 211 of the bracket 210, a video recording device 200 and carrier 240 can be inserted into the bracket 210 and its position substantially maintained as described below.

The present disclosure may further include a carrier or case 240 that may receive the video recording device 200. The person of ordinary skill will appreciate that the carrier 240 may be integral with the video recording device 200. As shown in FIG. 6, the carrier 240 may be a single piece of material, or multiple pieces of material, and of sufficient thickness to protect and carry the video recording device 200. The video recording device 200 may be, and may be the size of, a "smart phone", complete with a camera 200 (or video recording device) having a lens 202. Known video recording devices 200 may include a front or back display screen, or possibly both. The carrier 240 may include an LED light guide channel to bring light from a portion of a video recording device back display screen 206 across the holster 210 to a lens or light point, which may be used to display a solid or flashing light indicating that the device is in a recording status. In one exemplary embodiment, the carrier 240 may include one or more LED light guide channels to capture and direct light from a back touch sensitive display screen 206 to a display object on the front of the recording device or the carrier 240. So even though, in one embodiment, there may not be a front display screen on the recording device 200, portions of a back display screen can be programmed or otherwise manipulated to display status and control lights that are visible from the front of the carrier 240. As an example, if desired to actively display a blinking red light on the front of the carrier 240 whenever the recording device was recording, a portion of the video recording device's back screen could be made to pulse in red. An LED light guide channel could capture that blinking red light and cause the blinking red pattern to be visible from the front of the carrier 240. Of course, the carrier 240 could be configured to show any LED already provided by a video recording device as well.

Various sizes, shapes and colors can be supported depending upon the capabilities of the LED light guide channel used for this purpose. For example, the color red may flash at light point through the LED light guide channel for one (1) second every 3 seconds while the video recording device is actually recording video, audio, and/or metadata. Other examples and possibilities exist, and various implementations of the carrier 240 might include more than one LED light guide channel, flashing or constantly displaying one or more steady or flashing patterns of various light colors at lens. Regardless, as shown in FIG. 6, the back side of the carrier 240 may be substantially open, defined by two protruding side portions 241a and 241b. A bottom rail portion 241c may be provided to capture and retain a video recording device 200. In this manner, it will be appreciated that the video recording device 200 is retained in the carrier 240, and a rear display screen and any operating controls on the top or rear surfaces of the video recording device 200 are readily accessible to the user.

The carrier 240 may be configured and sized to accommodate a given recording device 200. The video recording device 200 includes a camera having a lens 202 that can be seen from a front side 203 of the device. The front side 203 may further include a speaker 204. The video recording device 200 may provide a rear, operative touch screen 206 that, as shown in FIG. 8, may be flipped or rotated so as to be seen from the front side 203 of the device. An audio broadcast speaker hole 242 may be defined in the carrier 240 and located over a speaker 204 provided by the video recording device. The size, location, and shape of this audio broadcast speaker hole or holes 204 can vary based upon the configuration of the recording device 200. It will be appreciated that use of the terms "video recording device," "audio recording device" and "recording device" are interchangeable depending in the desired features, in that a recording device may record either or both video and audio. Similarly, there could be one or more microphone or audio holes located in the front 203, side, or rear of the video recording device 200 to provide clear air audio access to one or more audio microphones provided on the device. There could be multiple configurations and one or more speaker or microphone holes in the carrier 240, and the carrier 240 could therefore be of multiple shapes, sizes, and materials consistent with the shape and size of the video recording device 200 hardware to be contained within the carrier 240 and the holster 210.

The overall shape and size of the video recording device carrier 240 and holster 210 may vary based upon the physical dimensions of the video recorder device 200. The person of ordinary skill will appreciate that a video recording device may conventionally provide control buttons or operational mechanisms (such as a touch pad or touch screen, switches, guides, knobs, etc.) on, for example, the back side 208 of the recording device 200 that are preferably accessed by a user. If such control mechanisms include a touch screen, such as that shown at 206, where a user touches a portion of a display screen in order to operate or control the recording device, a user would therefore also preferably have access to the portions of the screen that provide such operation or control of the recording device 200. The back side at 241a, 241b and 241c of the carrier 240 may therefore define an opening or set of openings that allow access to the video recording device 200 (and any touch screen such as 206) while it is in the carrier 240. It will therefore be appreciated that other configurations, sizes and shapes of recording device control devices could be provided, ranging from one opening as shown in the disclosed carrier 240 (described in detail below) to multiple openings in the carrier 240 which may be provided to execute control commands on a touch screen found on the video recording device 200. In one exemplary embodiment, there may be no control mechanisms provided for on the front or sides of the carrier 240, so that nothing is exposed to a person who may be facing or to the side of the officer.

Consistent therewith, the carrier 240 of an exemplary embodiment includes a front plate 243 that is joined to the side panels 241a and 241b. The front plate 243 provides a protective wall for the front of the video recording device 200. The front plate 243 of the carrier 240 further defines a cut out portion 246 that, as explained herein, is provided to permit an obstruction free pathway for the camera of a video recording device 200. More particularly, the lens of a camera in the video recording device 200, once it is inserted into the carrier 240, rests or sits immediately behind the cut out portion 246 so that there is no obstruction to the lens 202, which permits the camera to record an incident or events that are being witnessed or experienced by a user. Moreover, such an arrangement further allows for the recording a video data that is suitable for legal proceedings.

Figure 9:
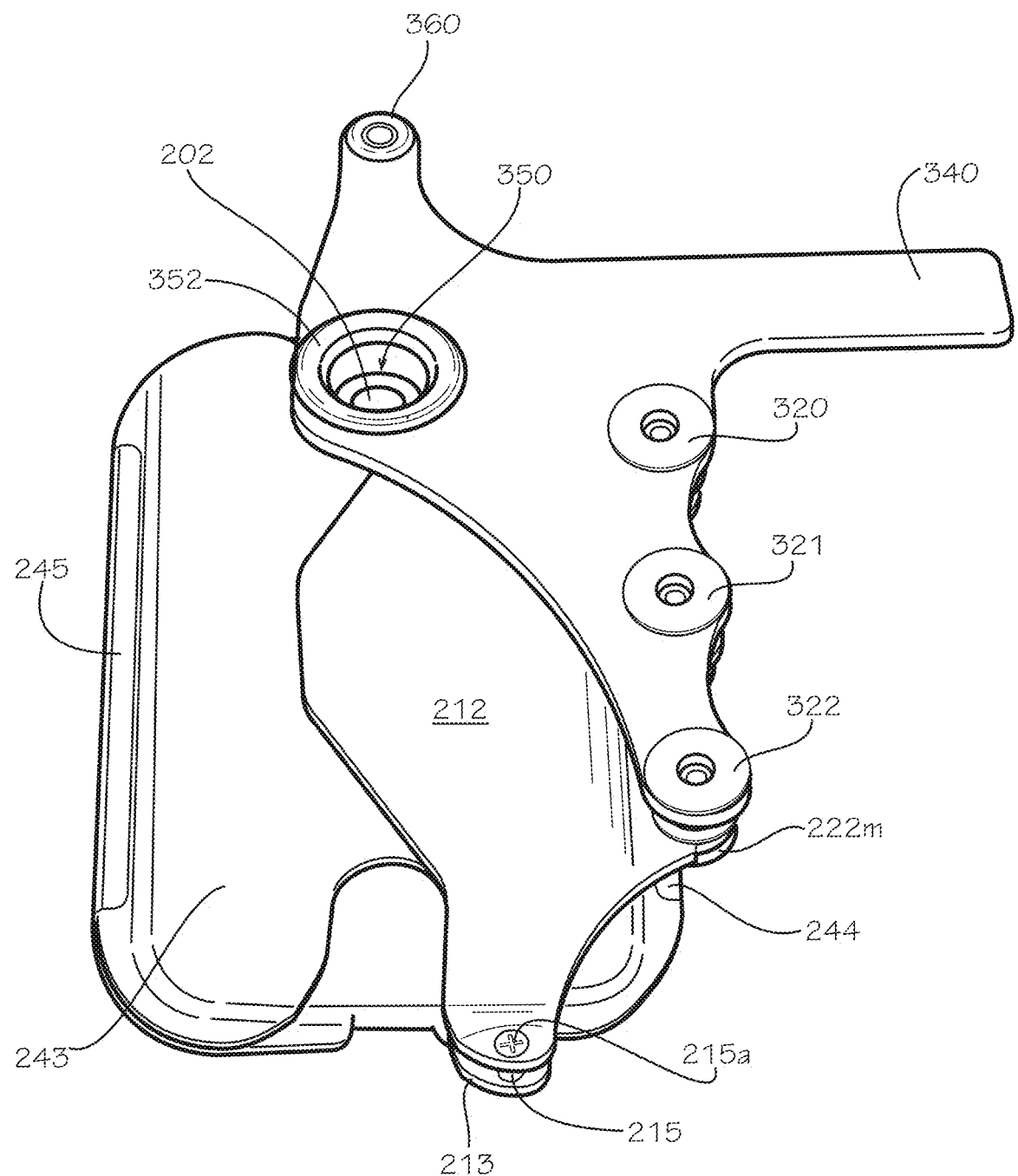
FIG. 9 is a perspective view of a holster, a carrier, and a retaining member suitable for use in a disclosed system.
Figure 10:
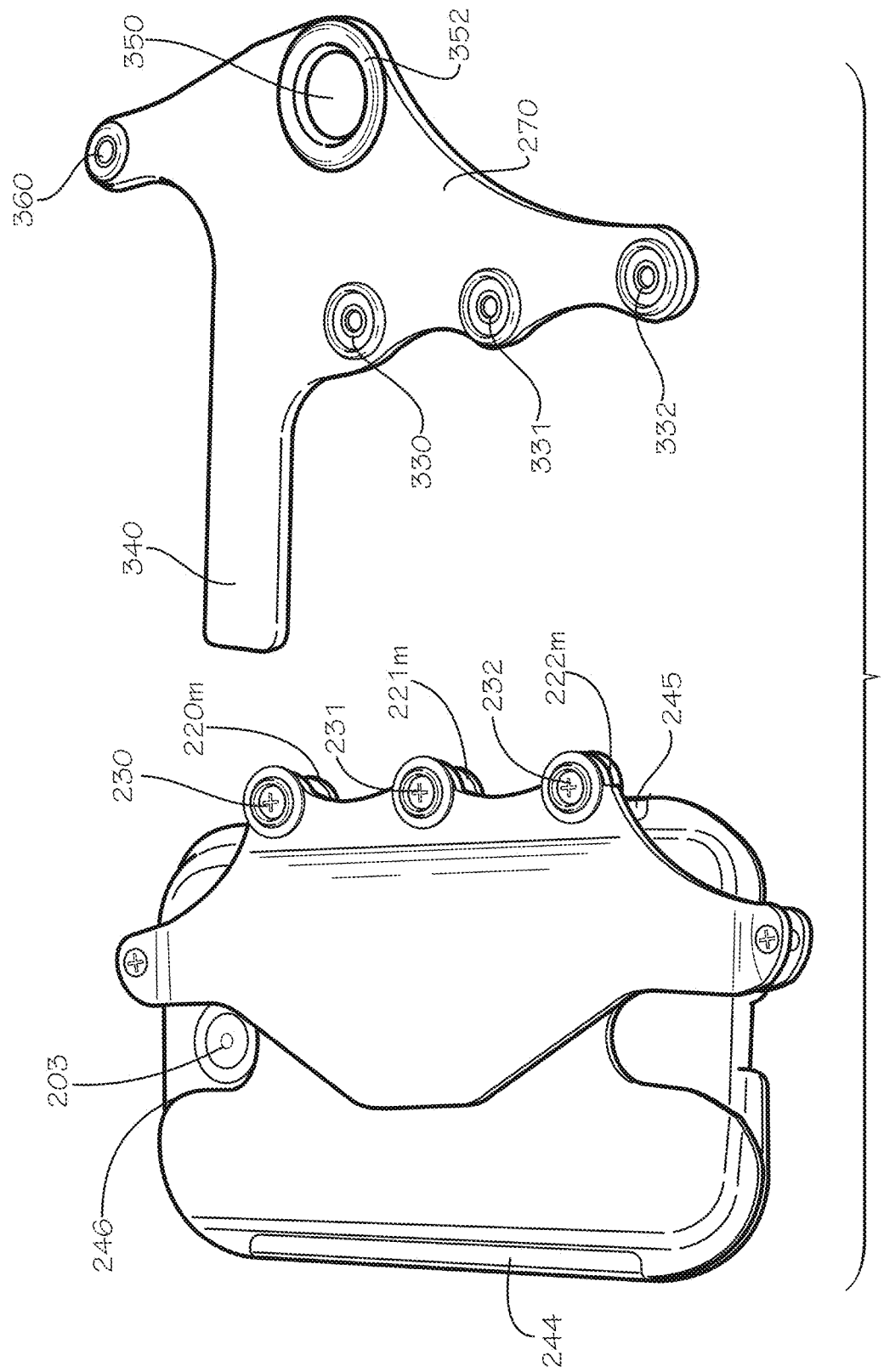
FIG. 10 is a perspective view of a holster, a carrier, and a retaining member suitable for use in a disclosed system, wherein the retaining member is separated from the holster.

Holster 210 cooperatively engages carrier 240, which is also preferably constructed of a rigid material such as steel, plastic, aluminum or any other material suitable for the purposes of the present disclosed device and method. Carrier 240 may be an integral unit, or may be comprised of the front plate 243 that is joined along respective edge portions of carrier side plates 241a and 241b. As stated above, the carrier 240 may be formed integrally with the video recording device 200 (which may also be a "smartphone"). The plate 243 may be joined by a crimp fastener or formed integrally with one another, or the plate 243 may be connected to the side elements 241a and 241b by any other suitable means. The carrier 240 may be sized to receive the recording device 200, which is in turn sized to be received by the holster 210. One side of the carrier 240 includes a magnetic metal strip 244. The other side of the carrier 240 is provided with a non-magnetic strip 245. Such an orientation and arrangement of metal strip 244 allows the carrier 240 to be inserted into the holster 210 and retained therein by virtue of the magnets 220m, 221m, and 222m acting upon the magnetic strip 244. By virtue thereof, the carrier 240, with the recording device 200 inserted therein, is guided by the plates 212 and 213 and the posts 215 and 216 to a certain pre-established position so that the lens 202 of the video recording device 200 may be repeatedly set to that position so that the lens of the camera is repeatedly placed immediately behind the cut out portion 246. If desired, respective portions 247 and 248 of plates 212 and 213, and the plates 242 and 243 may be provided with a tongue and groove arrangement or an indent that would serve to assist in maintaining their relative positions once the carrier 240 is inserted into the holster 210. As shown in FIGS. 8, 9 and 10, a recording device 200 with a lens 202 is operatively secured within the holster 210 and the carrier 240. Holster 210 and the carrier 240 are configured such that the lens 202 of the video recording device 200 is not obstructed, and thus the camera is able to record video data without interference from any of the system elements.

The holster 210 is configured to engage a retaining member or plate 270 shown in FIGS. 9, 10, 11, 12, 13 and 14. The retaining plate 270 is configured to engage holster 210. More particularly, three female connectors 320, 321 and 322 are attached to the retaining plate 270.

The connectors 320, 321 and 322 are positioned so as to be readily aligned with respective male studs 230, 231 and 232. In this manner, the male stud connectors 230, 231 and 232 of the holster 210 may be snapped into the female connectors attached to the retaining plate 270. This attachment may be done in any suitable manner, including by posts similar to that shown at posts 220, 221 and 222 and snaps 230, 231 and 232 if so desired. The retaining plate 270 defines a finger portion 340 and a view opening 350 defined by a grommet or ring 352. The retaining plate 270 further includes a rivet 360 at an upper portion thereof. The rivet 360 protrudes from the plate 270 to engage the shirt 100 material to secure the retaining plate 270 to the shirt. Alternatively, the fastener 360 (shown as a rivet) may also be a grommet or a snap.

Figure 11:
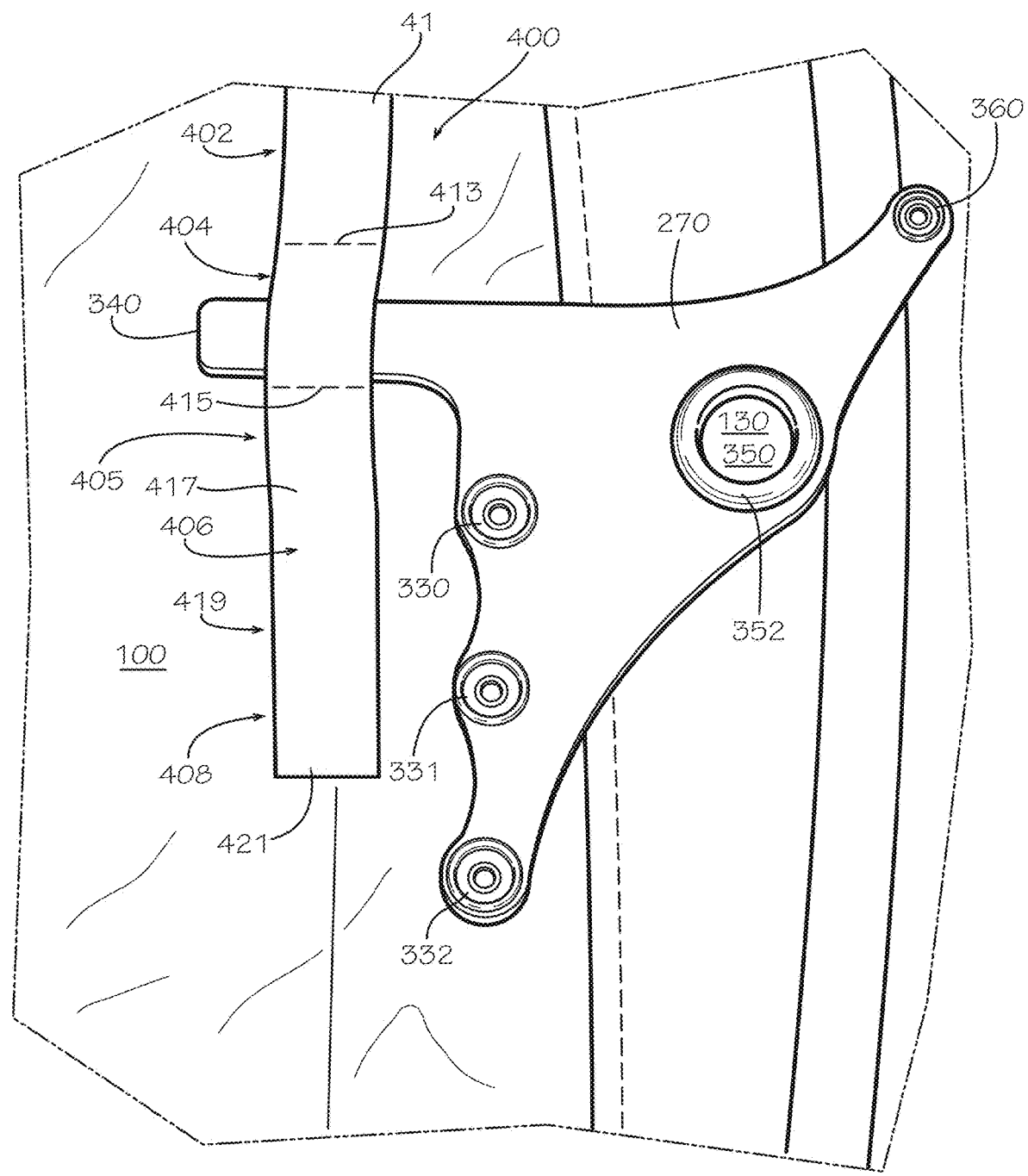
FIG. 11 is a plan view of a system showing a retaining member supported by an article of clothing.

Referring in more detail to FIG. 11, the retaining plate 270 may be configured to engage and be retained by the shirt 100. More particularly, the retaining plate 270 may be operatively suspended in the compartment 150 in the shirt 100. The inside material surface of the shirt 100 is provided with a strap 400, which defines certain openings or loops 402, 404, 405, 406 and 408 by means of stitching or seams 411, 413, 415, 417, 419 and 421. The strap 400 may extend and depend from a shoulder seam in the shirt 100 so as to reinforce the construction of the shirt and be able to support additional weight. The rivet 360 protrudes through the retaining plate 270 where it is covered by the cap 122. If desired, the rivet 360 may be covered by the piece of material 125 on the external surface of the shirt 100. As indicated above, the person of ordinary skill will appreciate that the orientation of the female socket and the male stud or post for any of the snaps or other connectors may be altered. In this manner, the retaining plate 270 may be secured at rivet 360 to the shirt 100 so that view opening 350 of the retaining plate 270 is aligned with view opening 130 in the shirt 100.

As further shown in FIG. 11, finger 340 of the retaining plate 270 is inserted into material loop or slot opening 404 as defined by seams 413 and 415. It will be appreciated that finger 340 may be placed in different positions by being inserted into a different loop or slot opening such as 402, 405, or 406 or otherwise as desired in the strap 400. Such positioning of the retaining plate 270 may depend upon a user's preference and adjustment is readily accomplished simply by removing finger 340 from one loop and inserting it in another loop. Moreover, as shown in FIG. 6 and other drawing figures, the retaining plate 270 may be formed to have two fingers 340 and 341, both of which may extend into loops 404 and 405 created in strap 400. More particularly, fingers 340 and 341 may be extended into openings 404 and 405, respectively, to provide support and suspend retaining plate 270 on the shirt 100. Further, as the strap 400 may depend and in an alternative embodiment may from the shoulder of the shirt 100, the weight of a recording device 200, a holster 210, a carrier 240 and a retaining member 270 may be distributed and, in part, may depend from and on the shoulder of the shirt. It is to be understood that other fasteners may be used to suspend or secure the retaining plate 270. For example, finger 340 (or finger 341) of the retaining plate 270 may be fitted with a rivet 370 to attach the plate to the shirt 100. While the placket 105 of shirt 100 may also be used to sustain the retaining member or plate 270, it need not do so. Yet further, it should be appreciated that the retaining member 270 can remain with the shirt 100 for extended periods of time. The shirt 100 may, for example, be cleaned or laundered with the retaining plate 270 attached.

It will be appreciated that the compartment 150 may be of sufficient size that the user can insert his or her hand into the compartment and manipulate the retaining plate 270 so that it is appropriately suspended or placed therein. A user of the disclosed system may readily pull down the zipper tab 165 to engage the compartment 150 or the inside of the shirt 100. Once done, the user may place the retaining plate 270 within the shirt 100 as shown and described herein. Once the retaining plate 270 is placed in a desired position, the snap elements 330, 331 and 332 are positioned to engage the holster snap elements 230, 231 and 232. The holster 210 may be snapped into or secured to the retaining plate 270 within the compartment 150 or the inside of the shirt 100. More particularly, snap stud elements 230, 231 and 232 on holster 210 may be engaged to retaining plate snap elements 330, 331 and 332. This action will cause the holster 210 to be secured and maintained within the compartment 150 or attached to the shirt 100 in a given desired position. Once that is accomplished, the video recording device 200 may be inserted into the carrier 240, and the carrier slidably inserted past the zipper 160 into the holster 210. In that way, the video recording device 200 is secured either within the compartment 150 or attached to the shirt 100 in such a manner that the video camera lens 202 is aligned with the view openings 130 and 350 so that the camera in the video recording device 200 is positioned to record and capture events, and to retain collected data. Still further, the holster 210 (which may be retained within the shirt 100 or the compartment 150) may be removed from the shirt 100 by unsnapping it from the retaining plate 270. Yet further, the carrier 240 and the recording device 200 can be removed from the holster 210 and manipulated by the user. For example, if an officer sought to manually operate the video recording device 200, the officer could pull down the zipper 160, remove the carrier 240 and video recording device 200 from the holster 210, and manipulate the back touch screen 206 of the device as need be. Once done, the officer could reinsert the video recording device 200 and the carrier 240 back into the holster 210, and the magnets 220m, 221m and 222m of the holster would engage the magnetic metal strip 244 of the carrier to dock and secure the video recording device 200 (including the lens 202 of the camera) in the proper place to insure an unobstructed pathway for the capture of video data. One benefit of the present disclosed device is that the holster 210 will consistently and repeatedly place and secure the lens 202 of the video recording device 200 in a position that is in registration with the openings 130, 246 and 350. By so doing, the disclosed apparatus and method insure that a clear, unobstructed pathway is present to facilitate recording by the video recording device 200.

Figure 14:
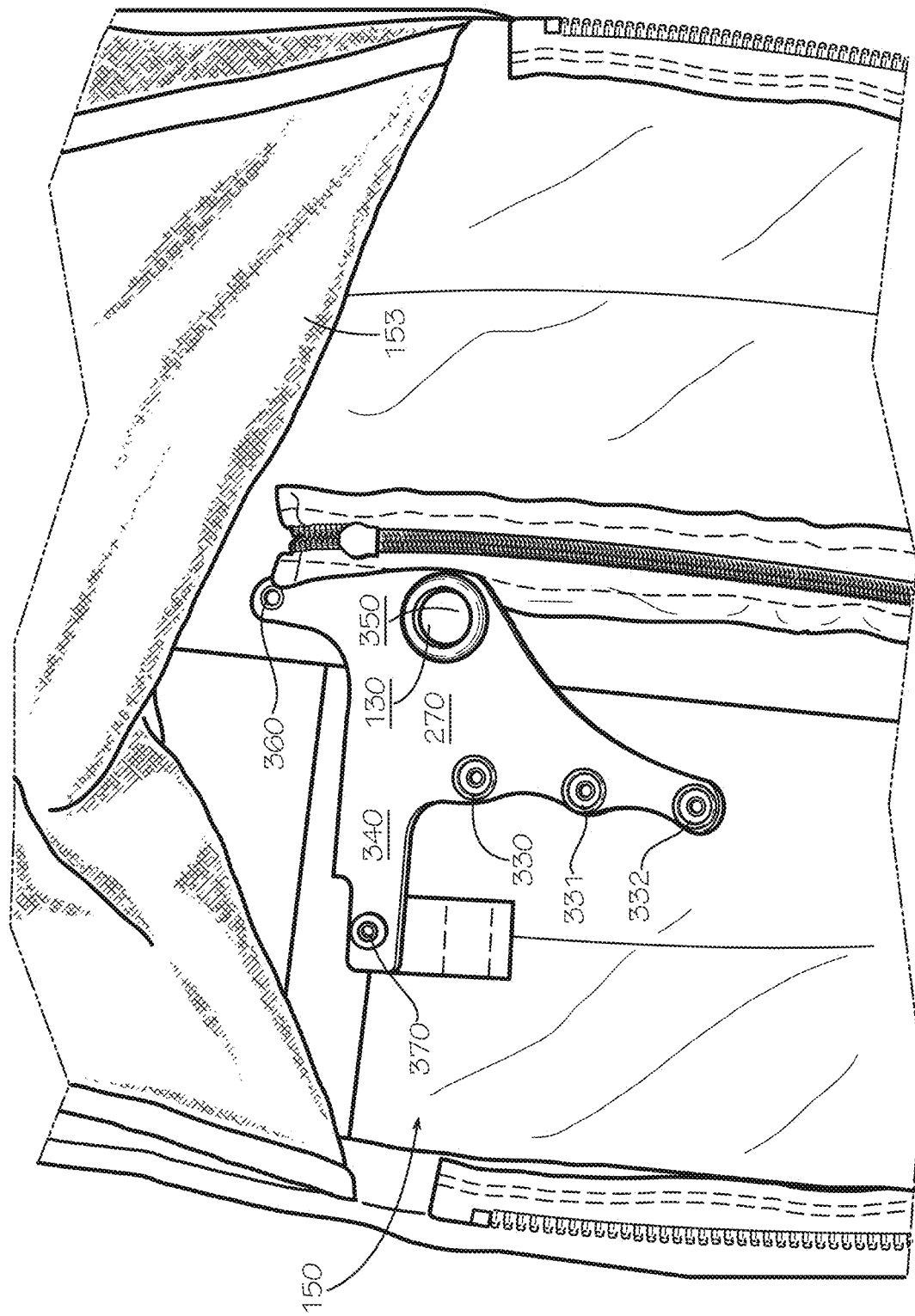
FIG. 14 is a perspective view of a disclosed system showing a retaining member supported in an article of clothing.

FIG. 14 shows yet another exemplary embodiment. As shown therein, the compartment includes a material liner 153. The retaining plate 270 is in a position such that the view opening 350 of the retaining plate 270 is aligned with the view opening 130 in the shirt 100. The female snap connectors 330, 331 and 332 are in position to engage the male stud snap connectors 230, 231 and 232 as described herein. The finger 340 is positioned in a manner similar to that shown in FIG. 11. However, in this example, the finger 340 includes a rivet 370 through the retaining plate 270 and through the shirt 100 to further secure the retaining plate to the shirt. The fastener 370 may be fitted with a cap similar to that shown at 122 in FIG. 2, or may be covered by a piece of material such as shown at 125 which further maintains the integrity of the article of clothing. By means of rivets 360 and 370, retaining plate 270 is positioned and suspended so as to receive the mounting bracket 210 so that the lens 202 of the camera of the video recording device 200 is aligned with view opening 130 in the shirt 100. The apparatus and method of the disclosure maintain and enhance the integrity of the clothing by eliminating clips and other such devices for attaching devices such as speaker/microphones, video recorders and the like to the article of clothing.

Figure 15:
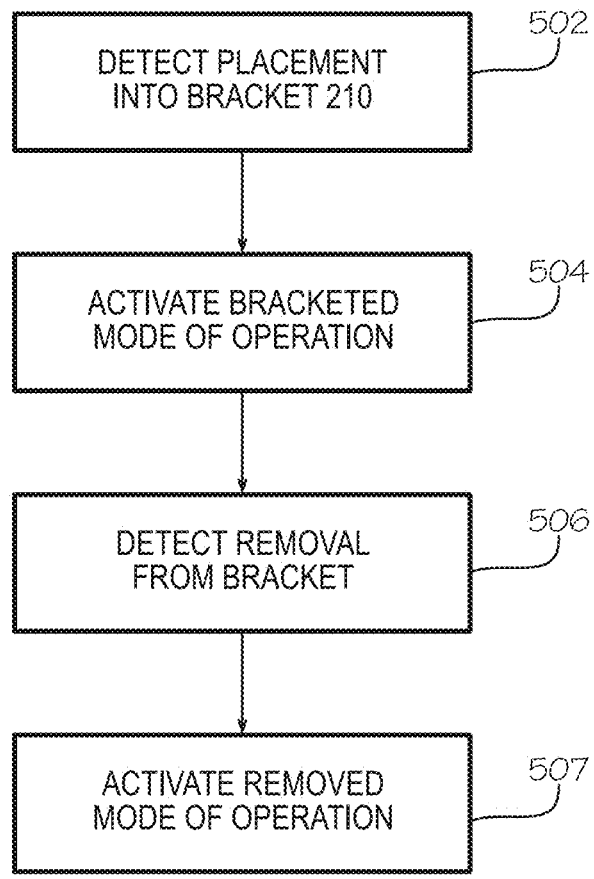
FIG. 15 is a flow diagram of a disclosed system showing operation of an exemplary embodiment.

Reference will now be made with reference to FIG. 15, which illustrates an exemplary method for using a video recording apparatus with a system as disclosed herein. At step 502, the video recording device 200 may detect placement of the video recording device 200 within the holster 210. For example, a near field communication chip, typically referred to as an NFC chip, may be located on the bracket 210 and may be read and authenticated by the video recording apparatus 200. Alternatively, the video recording device 200 may be placed into a mounted mode, such as by operating a button, switch, or providing a voice command to the video recording device.

The holster 210 and video recording device 200 may be assigned to a particular user or otherwise associated with each other to ensure that the video recording apparatus has been inserted into the appropriate holster 210. If the video recording apparatus 200 is inserted into the wrong bracket, in one exemplary embodiment, the user may be notified that he or she has have selected the wrong bracket. For example, at the beginning of a shift a law enforcement officer may accidentally use the holster 210 of one of his sister officers or colleagues. The video recording apparatus 200 may detect a mismatch between that video recording device 200 and holster 210, or between the holster 210 and other items such as an officer's vehicle, weapon, or other issued equipment. The video recording apparatus 200 may audibly notify the user, display a message, or vibrate to prompt the user to select the correct equipment.

Similarly, the NFC chip in the holster 210, video recording device 200, or other issued equipment may authenticate a match with other issued equipment. For example, the NFC chip in a holster 210, or associated with a video recording apparatus 200 may negotiate and authenticate with a vehicle such as a police car with an in-car video recording system (not shown). Video recorded using the video recording apparatus 200 and transferred to the on-board vehicle system may then be tagged using metadata as associated with a particular user. This allows the user to collect their equipment, enter a vehicle, and begin their shift without having to manually confirm that all of the correct equipment assigned to that user has been obtained.

Officers may use a plurality of different vehicles. As a user approaches a vehicle, the holster 210 or video recording apparatus 200 may authenticate with the vehicle in a parking lot using, for example, RF, Bluetooth, or a Wi-Fi connection. Because initially a plurality of vehicles may be in the parking lot, the signal strength may be monitored for a period of time or checked periodically. As a user gets into a vehicle and leaves the parking lot, the signal strength between the equipment he or she is carrying will diminish with vehicles other than the vehicle being driven. As a result, a positive match can be made between a user's equipment, including the vehicle, allowing data communications and video storage to accurately identify the user.

At step 504, the video recording device may activate a bracketed mode of operation. In the embodiment where a NFC chip or other means of authenticating a match between the holster 210 and the video recording apparatus is used, step 504 may occur once the equipment has been authenticated. Step 504 may therefore occur, in one embodiment, without input from a user other than placing the video recording device in the holster 210.

The bracketed mode of operation may provide operations relevant to use within a holster 210. For example, the video recording apparatus 200 may be a smartphone with all of the normal features of a smartphone while not inserted in the retaining plate 270 and under a first mode of operation. Upon inserting the smartphone into a retaining plate 270, software on the smartphone may automatically activate a second, bracketed mode of operation. The software may activate areas of the touch-screen display corresponding to the holes in the bracket previously described, so that a user may operate features in a holstered or bracketed mode of operation.

The software may display a user interface to the user. In one embodiment, to conserve battery while the device is in the holster 210, the display may be deactivated while still allowing input to be received.

Officers may find themselves in an incident that does not allow the recording device 200 to be manually operated or activated. Accordingly, voice recognition software may be used to control the video recording device 200. As an example, an officer may speak a command such as "start recording" to begin video recording without having to manually touch the video recording device 200. This allows the officer to remain focused on the situation at hand and keep their hands free for combat, controlling weapons, or other necessary tasks. As other examples, voice commands may be used to prompt for the remaining battery life, memory space left for recording, or availability of a Wi-Fi connection, which may be spoken through a speaker or displayed on the user interface. It will be appreciated that the commands discussed throughout this disclosure, as well as others, may be activated using voice commands.

In one embodiment, certain features may also be automatically activated based on NFC chips in the system. For example, an officer's weapon may have a NFC chip associated with the weapon holster. When the officer draws his weapon, the NFC chip may send a message to the video recording apparatus 200 using, for example, Wi-Fi, Bluetooth, or Zigbee communications. The video recording apparatus 200 may automatically begin recording audio and video in response to the officer drawing their weapon, without any interaction by the officer with the video recording device. As another example, the vehicle with an in-car video system may send a message to the video recording apparatus 200 to begin recording when the vehicle's emergency response lights or siren are activated.

To support operation of a bracketed mode of operation, one or more features of the smartphone may be automatically activated or deactivated upon insertion in the holster 210. For example, Bluetooth and/or Wi-Fi capabilities may be activated to allow recorded video to be transmitted to a base unit in a vehicle, or to a central dispatch location.

At step 506, removal of the video recording apparatus from the retaining plate 270 may be detected. Removal, like insertion, may be detected using, for example, a NFC chip. In one embodiment, the video camera device can be programmed not to operate if removed from the retaining plate 270, or to operate differently if removed from the bracket at step 508. As an example, if the video recorder device is actively capturing video when the device is removed from the holster 210, the "stop recording" command can be immediately disabled to ensure continual recording. In another example, if the video recorder device also had WiFi capability and the ability to use an embedded microphone and speaker to send and receive Voice Over IP (VOIP) telephone calls, the device could be programmed to block all VOIP and text messaging ports and commands when the device is in the holster 210. In this manner, in one embodiment, the video recording device may not accept and cannot be used to make VOIP phone calls or process text messages if the device is actively recording legal evidence video, audio, and/or metadata.

In another example, if the recording device 200 was removed from the holster 210, it could be programmed to allow a touch sensitive screen to display a telephone keypad to make VOIP phone calls, and/or or a text messaging display screen and keyboard to send and receive text messages. In another example, if the video recording device 200 also had a GPS chipset and latitude/longitude reporting capability, and the device was in the holster 210 and therefore in electrical contact with an embedded NFC chip, the device could be programmed to not allow VOIP phone calls to be made through voice commands, and/or to not allow text messages to be sent or received, if the device was in motion.

In another example, if the recording device 200 was actively recording, and it suddenly left the bracket and therefore lost communications with the NFC chip, and the device had a WiFi capability back to a WiFi-enabled in-car video recording and communications system that had wide area communications capability, an in-car video recording and communications system could immediately transmit alarms to central dispatch and other first responders within a designated GeoFence around the incident location. So if a citizen got the video recorder device 200 and removed it from the compartment or the bracket, alarms would immediately be broadcast across the police agency to address the situation and enhance officer safety.

In another example, if the video recording device 200 is left the holster 210 while recording, and the device had WiFi capability, the device could multicast an emergency notification to all other video recording devices and in car video recording devices within WiFi range, which could start video recording in those devices if they were not recording already. In another example, these other nearby devices may include a buffer that allows pre-event recording. The notification could be triggered to save their pre-event recording video, audio, and metadata for a period of time, such as the prior 30 to 60 seconds, before receiving the emergency message. As a further example, if the video recording device 200 was recording, was within WiFi range of an in car video recording and communications device, and was suddenly removed from the holster, the recording device could immediately start live streaming the video, audio, and metadata from the device back to the in-car video recording and communications device, which could further live stream that video and audio out to Central Dispatch. With an NFC chip in the holster 210, and an NFC chip reading capability in the video recording device 200, there are many other examples and use cases where the video recording device can be programmed to operate differently and perform/restrict different functions depending upon whether the video recording device is in the bracket with an NFC chip or not.

FIG. 15 illustrates an exemplary embodiment for inserting a video recording device 200 into a holster 210. In this example, the video recording device 200 may be, for example, a smartphone, although the video recording device may also be a dedicated camera or a camera with enhanced features. The video recording device 200 may include, for example, one or more processors to execute software stored in memory, read only memory, random access memory, other memory storage such as a hard drive, SD card, micro SD card, or flash memory, Wi-Fi capabilities, Bluetooth, Zigbee, internet access, voice call functionality, speakers, microphones and associated voice recognition software, a touch-screen display, volume control buttons, a GPS chip, and other features.

As illustrated in FIG. 15, the video recording device 200 may include a NFC chip 604 and holster 210 may include a NFC chip 608. NFC chips 604, 608 may be either a transmitter chip or a reading chip, and may be placed on the outside, inside, front, or back of the devices they are attached to. For example, the NFC chip 608 may be secured into holster 210, and NFC chip 604 may be placed under the cover of a smartphone. In one embodiment, NFC chip 608 may be a transmitting chip to NFC chip 604, and smartphone may handle verification of a match between the two chips.

The NFC chip and chip reading capability allows correlating other devices assigned to a police officer or other wearer of the video recorder device 200 and holster 210, to confirm that the identity of the user of the video recording device 402 is the same as the person assigned the use of the video recording device. Although not illustrated, additional NFC chips or stickers may be placed on, for example, a police officer weapon holster, badge, key fob, or other device or object uniquely assigned to an officer. The video recorder device 200 with NFC chip read capability 604 could confirm that the holster 210 and the other device were both registered to the same person. As an example, a mismatch between the NFC chip ID number assigned to the officer's video recorder device holster 210 and an NFC chip sticker on a side arm, or the officer's badge, a vehicle key fob, another device, or a police car or motorcycle, or any combination thereof, could trigger an alert. The sidearm weapon, badge, and police car may be assigned to Officer A, but the video recording device may be assigned to Officer B.

At the beginning of a shift, an officer may touch (or otherwise associate) a video recording device 200 with an NFC reader 604 and local or wide area communications capability to various NFC chips, such as 608, and stickers to provide positive confirmation that the video recorder device 200 is in the possession of the person to whom it was assigned. An officer might touch his video recorder device 200 to his badge, weapon, and police car NFC stickers at the start of a shift. This very quick and easy NFC touch process matching all NFC chips to the officer would positively confirm the identity of the officer, and provide confirmation of the chain of custody of the video recorder device used to record video. This in turn would support the chain of custody validation of video produced by that particular video recorder device.

The magnets 220*m*, 221*m* and 222*m* and the magnetic strip 244 also allow and insure a docked state between the video recording device 200 and the holster 210. For example, the magnetic 220*m*, 221*m* and 222*m* create a magnetic field that can be detected. The video recording device 200 (or "smartphone") can be provided with proximity detectors, or a magnetic proximity sensor circuitry, or programmed to determine if the device 200 and carrier 240 are docked with the holster 210 as attached to or placed within the garment. Moreover, the video recording device 200 can be programmed so that it is calibrated in such a fashion that when the device 200 is first inserted into the holster 210, that is registered as an "up" position. Thus, upon initial insertion of the video recording device 200 and the carrier 240 into the holster 210, the officer or other user is in an upright position. Should the officer or other user be hurt or otherwise in a prone or horizontal position for a predetermined time, the video recording device 200 (smartphone) may be programmed to recognize such a status and send a "man down" message.

Further, features of the video recording device may be activated upon recognizing a "docked" status by means of sensing the magnetic field. For example, many video recording devices 200 are equipped with a thirty (30) second pre-record or pre-event mode or feature. In such a mode or feature, a buffer is utilized to store events that occur for a pre-determined time (e.g., 30 seconds) prior to a triggering event. The recognition of a docked status could cause such a pre-event feature (or a post-event feature) to be automatically initiated upon docking.

Accordingly, the holster 210 and control techniques disclosed provide a reliable, secure, discrete, low cost, yet effective and safe way to control the operation of a video recording device. The holster 210 may also, in exemplary embodiments, help positively identify the wearer of the device so there is less opportunity for challenges to the legal chain of custody. The holster 210 also issues proper registration of a video recording device 200 to provide for consistent and reliable video capture even when a user turns quickly, is running or is distracted.

Referring to FIGS. 16A-16G, an exemplary device 1600 for holding a video and recording apparatus is shown. The video and recording apparatus is optionally a device for mobile computing and video and audio recording and playback. Also, the video and recording apparatus is optionally a smartphone, which is generally shown in FIG. 16E. Although a smartphone 1604 is generally shown in FIGS. 16, 17, 19, and 21, it is noted that any appropriate video and recording apparatus or device for mobile computing and video and audio recording and playback may be used. As shown in FIG. 16A, the device 1600 includes a carrier 1602 and a holster 1606. Carrier 1602 can be used to receive, hold, secure, or retain a smartphone 1604. Carrier 1602 may be sized such as to hold a smartphone 1604 of any size or dimensions from a variety of manufacturers or distributors. Likewise, holster 1604 may be sized such as to hold carrier 1602, which in turn holds smartphone 1604, such that holster 1604 is of any size or dimensions for holding a respective carrier 1602. The carrier 1602 thus may be sized to receive the smartphone 1604, which is in turn sized to be received by the holster 1606. Carrier 1602 may also include respective ports or openings or accesses 1706 and 1708 (as generally shown in FIGS. 17A, 17B, 17D, and 17F) for, for example, a charging port, an input port, and/or a headphones port, as appropriate and/or needed and/or required by the specific smartphone.

Referring to FIGS. 17A-17G, exemplary carriers 1602 are shown. FIGS. 17A and 17B shown an example carrier 1602 without a smartphone (or a video and recording apparatus) therein. FIG. 17E shows an exemplary carrier 1602 with a smartphone 1604 received therein. The carrier 1602 defines a metal portion 1702, which may be a metal strip, metal posts, or any other suitable piece of metal or magnetic element in an appropriate shape, size, or configuration.

Referring again to FIG. 16A, device 1600 also includes a holster 1606, which receives the carrier 1602. The holster 1606 may include at least one fastener 1608. The holster 1606 may also include two fasteners, three fasteners, or any number of fasteners that will sufficiently allow for retention of the holster 1606 in place, including within or inside an article of clothing. Additional exemplary holsters 1606, without the carrier 1602 received therein, are shown in FIGS. 18A-18G.

As shown in FIGS. 16A and 18A-18G, the holster 1606 also includes a magnetic element 1802. The magnetic element 1802 may include individual magnets or a magnetic strip. Further, the magnetic element 1802 may be a magnetic strip, magnetic posts, or any other suitable magnet or piece of magnet in an appropriate shape, size, or configuration to mirror the metal portion 1702 of the carrier 1602. Holster 1606 further includes a view hole 1804. The view hole 1804 allows video to be recorded by the smartphone therethrough. The view hole 1804 may also be configured to cooperate with and include a wide-angle lens 1806. The view hole 1804 is positioned so as to be aligned with a camera or recording device of the smartphone 1604.

The wide-angle lens 1806 is included in view hole 1804 in order to increase the horizontal field of view of the smartphone 1604. The wide-angle lens has a field-of-view of between 5 degrees and 180 degrees. For example, the wide-angle lens has a field-of-view of 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, 90 degrees, 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, 170 degrees, 175 degrees, 180 degrees, or any other field-of-view, including those therebetween the aforementioned ranges, that will sufficiently allow for recording video in an appropriate field of view. Optionally, the wide-angle lens has a field-of-view of 180 degrees or less. For example, the wide-angle lens 1806 may be attached to the holster 1606 at the location of the view hole 1804 by any acceptable means, including use of a threaded connection between the wide-angle lens 1806 and the retaining plate (see FIG. 20) or between the wide-angle lens and the recording device or between the wide-angle lens and the holster 1606. Of course, other connection devices may be utilized, including a snap-fit, a press-fit, clips or an external compression fitting that secures the wide-angle lens 1806 in place over the view hole 1804 of the holster 1606. Such mechanisms would be known to the person of ordinary skill in the art.

The wide-angle lens 1806 of a first field-of-view may be removed from the view hole 1804 of holster 1606 and replaced with a wide-angle lens 1806 of a second or different field-of-view range. For example, depending on need and/or user preference, the wide-angle lens 1806 may include a field-of-view that is appropriate and may be easily changed. In addition, and in the alternative, a wide-angle lens may not be necessary depending on the viewing capabilities of the video and recording device or the smartphone. For instance, the video and recording device or the smartphone may include a horizontal field of view that is appropriate.

FIG. 16A shows the carrier 1602 received within the holster 1606. When the carrier 1602 is inserted into the holster 1606, the magnetic element 1802 of the holster 1606, in combination with the metal portion 1702 of the carrier 1602, acts to urge the carrier 1602 into said holster 1606 and registers said carrier 1602 within said holster 1606. One side of the carrier 1602 includes a metal portion 1702, which may include one or more metal strips or individual magnets. The other side of the carrier 1602 does not include any metal elements. Such an orientation and arrangement of metal portion 1702 allows the carrier 1602 to be inserted into the holster 1606 and retained therein by virtue of the magnetic element 1802 acting upon the metal portion 1702. By virtue thereof, the carrier 1602, with the smartphone 1604 inserted therein, is guided a certain pre-established position so that the lens of the smartphone 1604 may be repeatedly set to that position so that the lens of the smartphone is repeatedly placed immediately behind the view hole 1804 and wide-angle lens 1806. If desired, respective portions 1808 and 1704 of holster 1606 and carrier 1602, respectively, may be provided with a tongue and groove arrangement or an indent that would serve to assist in maintaining their relative positions once the carrier 1602 is inserted into the holster 1606. In addition, respective portions 1808 and 1704 of holster 1606 and carrier 1602, respectively, may be provided with a tongue and groove arrangement or an indent that would serve to assist in guiding the carrier 1602 into the holster 1606.

Referring to FIGS. 19A and 19E, an exemplary device 1900 for removably securing a video and recording apparatus, which may include a smartphone, within or inside an article of clothing is shown. Similar to device 1600, device 1900 includes a carrier 1602 that receives a smartphone 1604 and defines a metal portion 1702. Device 1900 is also similar to device 1600 in that device 1900 also includes a holster 1606, which receives the carrier 1602. Device 1900 further includes at least one fastener 1608, a magnetic element 1802, and a view hole 1804 that includes a wide-angle lens 1806. Device 1900 also shows that when the carrier 1602 is inserted into the holster 1606, the magnetic element 1802 of the holster 1606, in combination with the metal portion 1702 of the carrier 1602, acts to urge the carrier 1602 into said holster 1606 and registers said carrier 1602 within said holster 1606. Unlike device 1600, device 1900 also includes a retaining plate 1902.

Referring to FIGS. 20A-20G, an exemplary retaining plate 1902 is shown. Retaining plate 1902 includes at least one fastener 2002. The retaining plate 1902 may also include two fasteners, three fasteners, or any number of fasteners that will sufficiently allow for retention of the holster 1606 in place with the retaining plate 1902, including within or inside an article of clothing. As shown in FIGS. 19A, 19C, and 19E, the holster 1606 is configured to engage a retaining member or plate 1902. The retaining plate 1902 is configured to engage holster 1606. More particularly, female or male connectors 2002 may be included on the retaining plate 1902 and respective male and female connectors 1608 may be included on the holster 1606. The connectors 1608 are positioned so as to be readily aligned with their respective counterpart connectors 2002. For example, if a female connector is on the holster 1606, the counterpart connector on the retaining plate 1902 would be a male connector, and vice versa. In this manner, the connectors 1608 (whether male or female connectors) of the holster 1606 may be snapped into or connected to the counterpart connectors 2002 attached to the retaining plate 1902. This attachment may be done in any suitable manner, including by posts or otherwise.

Figure 21B:
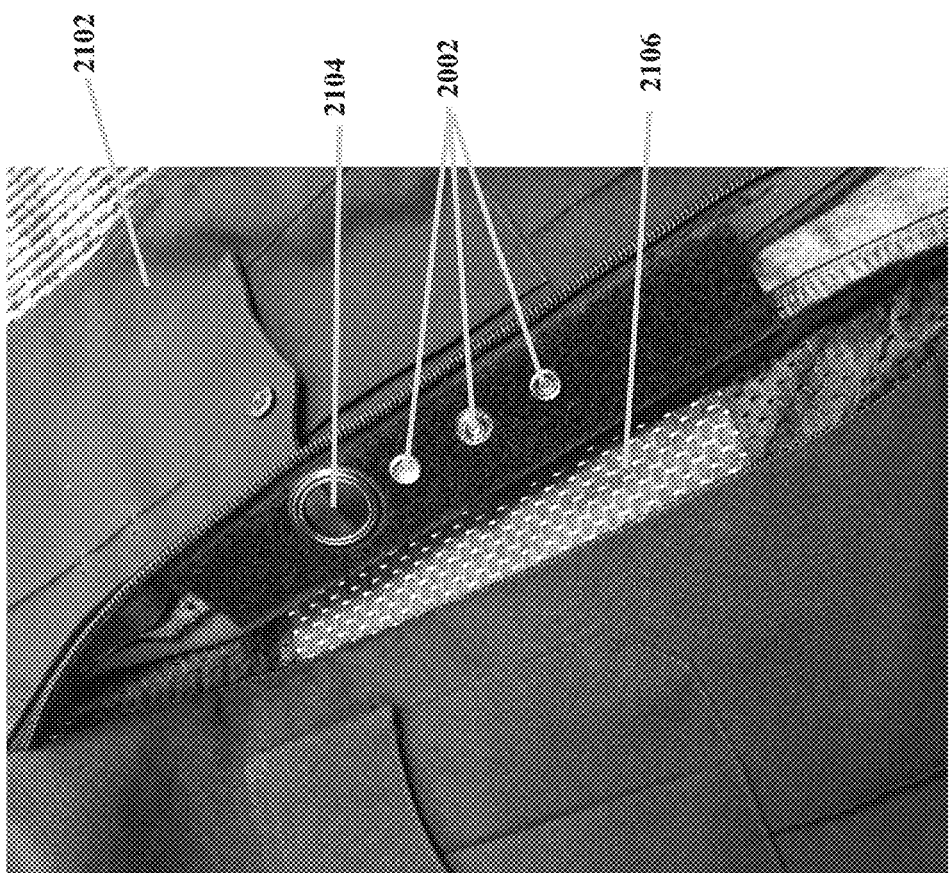
FIG. 21B is a perspective view of an exemplary system showing an article of clothing with a retaining plate and a view hole.
Figure 21A:
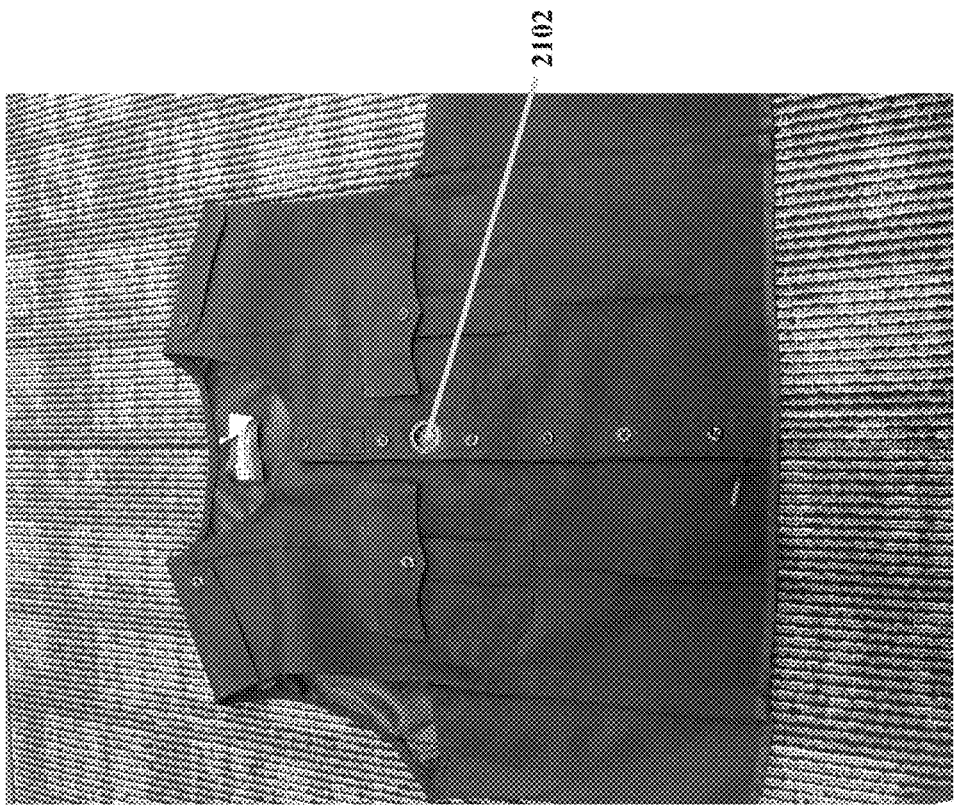
FIG. 21A is a perspective view of an exemplary system showing an article of clothing with a view hole.
Figure 21D:
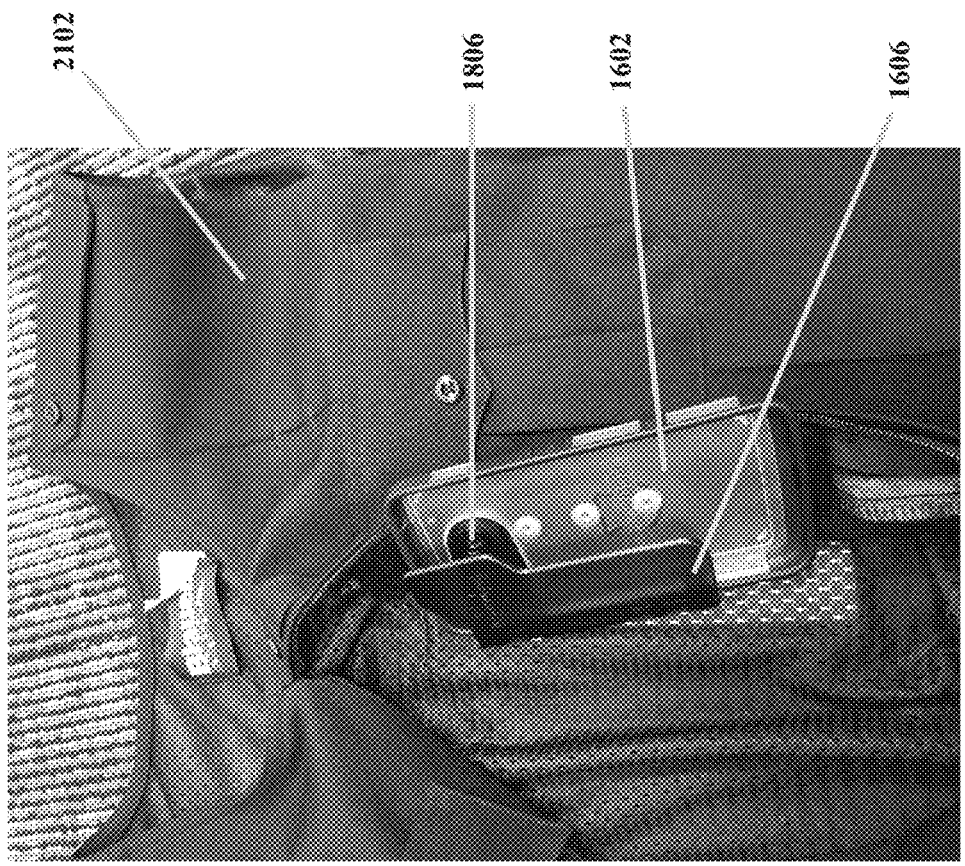
FIG. 21D is a perspective view of an exemplary system showing an article of clothing with a device for holding a video and recording apparatus is shown.
Figure 21C:
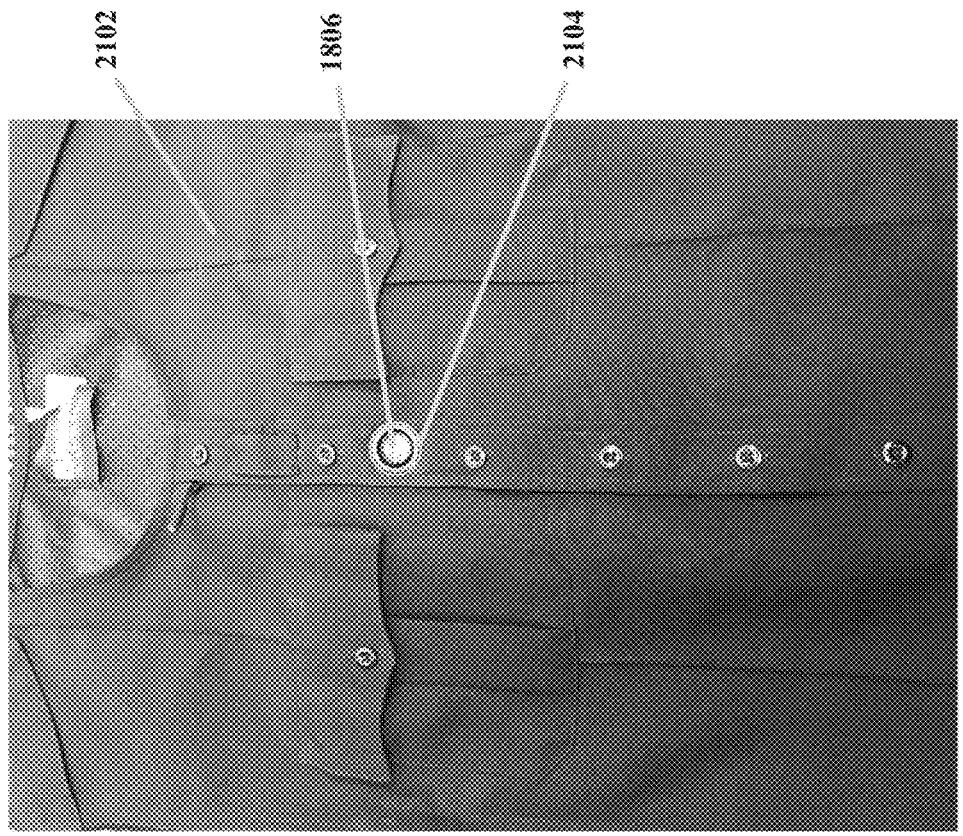
FIG. 21C is a perspective view of an exemplary system showing an article of clothing with a smartphone with wide-angle lens.

The retaining plate 1902 may include a view opening 2004 defined by a grommet or ring 2006. The grommet or ring 2006 is included at the upper portion of the retaining plate 1902. The retaining plate 1902 may be formed out of any type of rigid material, including metal, plastic, steel, stone, synthetic material, or any other suitable rigid material. For example, the retaining plate 1902 may be formed out of stainless steel or spring steel, neither of which rusts but allows for bending. The grommet or ring 2006 may be a standard size such that the retaining plate 1902 may be secured within a uniform, vest, shirt, jacket, or otherwise such that it is converted for use into or within or inside of an article of clothing so as to secure a device holding a camera or recording device such as a smartphone. This may be accomplished by creating or punching a hole through the article of clothing and attaching the retaining plate 1902 to or within or inside the article of clothing via the grommet or ring 2006. The article of clothing may also include a compartment 2106 for receipt of the carrier 1602, the holster 1606, and the smartphone 1604, as shown in FIG. 21B. The retaining plate 1902 may also have attached thereto some material, such as cloth, hook and loop material (as shown in FIG. 21B), or another sturdy material, that is connected to the article of clothing 2102 to secure or otherwise hold the retaining plate 1902 in place, such that the article of clothing 2102 and the retaining plate 1902 are connected or integrally formed.

When the holster 1606 (and carrier 1602 and smartphone 1604) is attached to an inner surface of the article of clothing 2102 via the connectors 1608 and 2002, the wide-angle lens 1806 is aligned with the view opening 2104 of the article of clothing 2102 and the camera or recording device of the smartphone 1604 such that there is an unobstructed path between said smartphone 1604 and wide-angle lens 1806 and the exterior of said article of clothing 2102 by way of the view opening 2104. The wide-angle lens 1806 may be used in connection with the camera or recording device 1604 to capture images in addition to that provided by a conventional camera or recording device. Alternatively, the wide-angle lens 1806 may be removed (either by unscrewing the wide-angle lens or by otherwise removing it from engagement with for example the retaining plate 1902) such that the camera or recording device is operated without the wide-angle lens.

As described elsewhere herein, this implementation also provides that the smartphone 1604 (or any appropriate video and recording apparatus) may detect a first upright orientation upon insertion of the smartphone 1604 into said holster 1606. The smartphone 1604 may also detect a second, different orientation and, if said second, different orientation is maintained for a predetermined period of time, the smartphone 1604 generates an alert informing of such a condition.

The smartphone 1604 (or any appropriate video and recording apparatus), as described herein, may also detect occurrence of an event. For instance, the wearer of the smartphone 1604 may turn quickly, begin running, or draw his/her weapon, or the smartphone may detect a gunshot has been fired. In other instances, a struggle may be an event, in which a police officer struggles with a perpetrator, during which, for example, random and/or rapid motions are orientations are detected by the smartphone and/or the smartphone's accelerometer. In other cases, for example, the wearer may enter a specified geographical zone (i.e., GeoFence) that corresponds to a location of an emergency call. For instance, a person may, in the event of an emergency, use her/his phone to dial 911 (or another appropriate emergency number). That emergency phone call may be received by the police department or appropriate emergency call center. Further, that emergency call may be received and automatically processed by a computer-aided dispatching (CAD) system that receives and processes emergency and/or 911 calls. The 911 and/or emergency call may then be automatically assigned or dispatched to a specific emergency response officer or personnel for response by traveling to the location of the 911 and/or emergency caller. For instance, the CAD system may send a message with the 911 and/or emergency call location to an appropriate processing or operating system, which may automatically generate a specified geographical zone (i.e., GeoFence) around the location of the 911 and/or emergency caller. When the emergency vehicle and/or personnel enters into the specified geographical zone (i.e., GeoFence), such may constitute the occurrence of an event without any manual intervention from emergency response personnel or police officer.

In such instances when the video recording device is in pre-event recording mode, the video recording device continuously records video and/or audio on a rolling basis for 30 seconds, 60 seconds, 120 seconds, or any other appropriate amount of time of video and audio recording on a rolling loop basis. If no event is detected, the recorded video and audio is deleted after a certain amount of time or on a rolling basis. Upon occurrence of an event, however, the detection of which would be automatic and would not require input or otherwise from the wearer or user, the recorded video and audio for a predetermined amount of pre-event time is automatically saved and video and audio are continuously recorded for either another predetermined amount of time or until user intervention to stop recording of audio and/or video.

Also provided herein is a method for securing a video and recording apparatus, which may include a smartphone, within or inside an article of clothing. For example, in one implementation, the method includes providing a device for holding a smartphone, such as devices 1600 and 1900 described herein, which include a carrier 1602, a holster 1606, and a retaining plate 1902. The method may further include providing a smartphone for the carrier 1602 and receiving the carrier 1602 within the holster 1606. Further provided in the exemplary method is an article of clothing 2102 that defines a compartment 2106 for receipt of the carrier 1602, the holster 1606, and the smartphone 1604. The method may also include defining a view opening 2104 on the article of clothing 2104 whereby the view opening 2004 of the retaining plate 1902 is aligned with the view opening 2104 in said article of clothing 2102 to maintain an unobstructed path between said smartphone 1604 and wide-angle lens 1806 and an exterior of said article of clothing 2102 by way of said view opening 2004 in said retaining plate 1902 and said view opening 2104 in said article of clothing 2102. Yet further, the exemplary method includes recording video and collecting video data.

The exemplary method for securing a smartphone 1604 within or inside an article of clothing 2102 may also include removing the carrier 1602 from the holster 1606 whereby a user may take photographs or record video with the smartphone 1604. For example, following an event during which video is recorded and collected, a law enforcement official may wish to take additional photographs or record additional video for evidentiary purposes. In that case, it would be possible for the law enforcement official to remove the holster 1606 from the retaining plate 1902, and thereafter remove the carrier 1602 (which includes smartphone 1604) from the holster 1606. The law enforcement official may then use the smartphone to, for example, gather additional evidence (by taking additional video or photographs), contact headquarters or others with the smartphone, or transmit any photographic or video evidence to the appropriate persons or entities. When the smartphone 1604 is within the carrier 1602 but removed from the holster 1606 (as shown in FIG. 17E), video or photographs may be taken or captured without the wide-angle lens 1806, which remains attached to the holster 1606. In the alternative, for example, the holster 1606, carrier 1602, and smartphone 1604 may be removed from the retaining plate 1902 and the article of clothing 2102, as shown in device 1600 in FIG. 16A, and video or photographs may be taken or captured with the wide-angle lens 1806, should such a horizontal field of view be desired or appropriate.

As described elsewhere herein, the method may also include providing a magnetic field within said holster 1606 that operates to register said smartphone 1604 in a docked position and secure said carrier 1602 and smartphone 1604 within the holster 1606. Further the method may include determining a first orientation of the smartphone 1604 when the smartphone 1604 is first registered within the holster 1606 and determining a second orientation of the smartphone 1604 after the smartphone 1604 has been registered within the holster 1606. The method may further include setting a predetermined period of time for the smartphone 1604 to be in said second orientation, such that if the smartphone 1604 remains in the second orientation for a period of time that exceeds the predetermined period of time, the smartphone 1604 issues an alert.

In addition, the exemplary method described herein may include recording for a predetermined pre-event period of time based on occurrence of an event. Any such event may include the wearer of the smartphone turning quickly, beginning to run, or drawing his/her weapon from a gun holster, or the smartphone detecting that a gunshot has been fired.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or objectoriented programming language to communicate with a computer system. However, the program(s) can be implemented in assembly or machine language, if desired. In any case, the language may be a compiled or interpreted language and it may be combined with hardware implementations.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems may generally be integrated together in a single software product or packaged into multiple software products.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The invention claimed is:

1. A device for removably securing a video and recording apparatus within an article of clothing, the device comprising:
   a carrier that receives a video and recording apparatus, the carrier defining a metal portion;
   a holster that receives said carrier, said holster comprising:
      at least one fastener;
      a magnetic element; and
      a view hole to allow video to be recorded by the video and recording apparatus, the view hole comprising a wide-angle lens and positioned so as to be aligned with a camera or recording device of the video and recording apparatus;
   wherein the magnetic element of the holster, in combination with said metal portion of said carrier, acts to urge said carrier into said holster and registers said carrier within said holster; and
   a retaining plate, the retaining plate including at least one fastener for securing said holster to said retaining plate via the at least one fastener of the holster, whereby the holster may be fastened to said retaining plate, and said video and recording apparatus is placed into said carrier, which is in turn placed into said holster such that the video and recording apparatus is attached to or within an article of clothing;
   wherein the article of clothing includes a view opening and the holster is secured within the article of clothing whereby the wide-angle lens is aligned with the view opening and the camera or recording device of the video and recording apparatus is aligned with the wide-angle lens, such that there is an unobstructed path between said video and recording apparatus and wide-angle lens and the exterior of said article of clothing by way of the view opening.

2. The device of claim 1, wherein the article of clothing defines a compartment for receipt of the carrier, the holster, and the video and recording apparatus.

3. The device of claim 1, wherein said retaining plate defines a view opening aligned with said view opening in said article of clothing to maintain an unobstructed path between said video and recording apparatus and wide-angle lens and an exterior of said article of clothing by way of said view opening in said retaining plate and said view opening in said article of clothing.

4. The device of claim 1, wherein the video and recording apparatus detects a first upright orientation upon insertion of the video and recording apparatus into said holster, detects a second, different orientation and, if said second, different orientation is maintained for a predetermined period of time, the video and recording apparatus generates an alert informing of such a condition.

5. The device of claim 1, wherein if the video and recording apparatus detects occurrence of an event, the video and recording apparatus retains video and audio previously recorded for a predetermined pre-event period of time and continues to record video and audio.

6. The device of claim 5, wherein the event comprises a gunshot, retrieval of a user's gun out of a gun holster, running, a struggle, or entry into a specified geographic zone corresponding to a location of an emergency call.

7. The device of claim 1, wherein the video and recording apparatus comprises a device for mobile computing and video and audio recording and playback.

8. The device of claim 1, wherein the video and recording apparatus comprises a smartphone.

9. A method of securing a video and recording apparatus within an article of clothing, the method comprising:
   providing a device for holding a video and recording apparatus, the device comprising:
      a carrier that receives the video and recording apparatus, the carrier defining a metal portion;
      a holster that receives said carrier, said holster comprising:
         at least one fastener;
         a magnetic element; and
         a view hole to allow video to be recorded by the video and recording apparatus, the view hole comprising a wide-angle lens and positioned so as to be aligned with a camera or recording device of the video and recording apparatus;
providing a video and recording apparatus for the carrier;
receiving the carrier within the holster;
providing a retaining plate, the retaining plate defining a view opening and including at least one fastener for securing said holster to said retaining plate via the at least one fastener of the holster, whereby the holster may be fastened to said retaining plate;
providing an article of clothing that defines a compartment for receipt of the carrier, the holster, and the video and recording apparatus;
defining a view opening on the article of clothing whereby the view opening of the retaining plate is aligned with the view opening in said article of clothing to maintain an unobstructed path between said video and recording apparatus and wide-angle lens and an exterior of said article of clothing by way of said view opening in said retaining plate and said view opening in said article of clothing; and
recording video and collecting video data.

10. The method of claim 9, further comprising removing the carrier from the holster whereby a user may take photographs or record video with the video and recording apparatus.

11. The method of claim 9, further comprising:
providing a magnetic field within said holster that operates to register said video and recording apparatus in a docked position and secure said carrier and video and recording apparatus within the holster;
determining a first orientation of the video and recording apparatus when the video and recording apparatus is first registered within the holster;
determining a second orientation of the video and recording apparatus after the video and recording apparatus has been registered within the holster; and
setting a predetermined period of time for the video and recording apparatus to be in said second orientation, such that if the video and recording apparatus remains in the second orientation for a period of time that exceeds the predetermined period of time, the video and recording apparatus issues an alert.

12. The method of claim 9, further comprising saving video and audio previously recorded for a predetermined pre-event period of time and continuing to record video and audio.

13. The method of claim 12, wherein the event comprises a gunshot, retrieval of a user's gun out of a gun holster, running, a struggle, or entry into a specified geographic zone corresponding to a location of an emergency call.

14. The method of claim 13, wherein the specified geographic zone corresponding to a location of an emergency call is automatically created by a message to the video and recording apparatus that originates from a computer-aided dispatching system that includes the location of the emergency call.

15. The method of claim 9, wherein the video and recording apparatus comprises a device for mobile computing and video and audio recording and playback.

16. The method of claim 9, wherein the video and recording apparatus comprises a smartphone.

* * * * *